US011665350B2

(12) United States Patent
Gao et al.

(10) Patent No.: US 11,665,350 B2
(45) Date of Patent: May 30, 2023

(54) METHOD AND APPARATUS FOR VIDEO ENCODING AND DECODING

(71) Applicant: TENCENT TECHNOLOGY (SHENZHEN) COMPANY LTD, Guangdong (CN)

(72) Inventors: Xinwei Gao, Shenzhen (CN); Xu Nan Mao, Shenzhen (CN); Chen Chen Gu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 429 days.

(21) Appl. No.: 16/992,982

(22) Filed: Aug. 13, 2020

(65) Prior Publication Data

US 2020/0374524 A1 Nov. 26, 2020

Related U.S. Application Data

(63) Continuation of application No. PCT/CN2019/090002, filed on Jun. 4, 2019.

(30) Foreign Application Priority Data

Jun. 20, 2018 (CN) .......................... 201810638012.5

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/172* (2014.11); *H04N 19/188* (2014.11); *H04N 19/30* (2014.11)

(58) Field of Classification Search
CPC ............... H04N 19/105; H04N 19/132; H04N 19/172; H04N 19/126; H04N 19/136;
(Continued)

(56) References Cited

U.S. PATENT DOCUMENTS 10,602,161 B2 * 3/2020 Lee ........................ H04N 19/31
2004/0213345 A1 * 10/2004 Holcomb ............. H04N 19/527
375/240.03
(Continued)

FOREIGN PATENT DOCUMENTS

| CN | 102238380 A | 11/2011 |
|----|----|----|
| CN | 105959700 A | 9/2016 |

(Continued)

OTHER PUBLICATIONS

Written Opinion dated Aug. 22, 2019 from the International Searching Authority in International Application No. PCT/CN2019/090002.
International Search Report for PCT/CN2019/090002 dated Aug. 22, 2019 [PCT/ISA/210].

*Primary Examiner* — Nathnael Aynalem
(74) *Attorney, Agent, or Firm* — Sughrue Mion, PLLC

(57) ABSTRACT

A video encoding method, performed by a computer device, includes: obtaining a reference frame corresponding to a current frame from a video input to be encoded; determining a sampling manner corresponding to the current frame; sampling the reference frame based on the sampling manner according to resolution information of the current frame, to obtain a target reference frame corresponding to the reference frame; and encoding the current frame according to the target reference frame.

20 Claims, 12 Drawing Sheets

(51) Int. Cl.
*H04N 19/172* (2014.01)
*H04N 19/169* (2014.01)
*H04N 19/30* (2014.01)

(58) Field of Classification Search
CPC .... H04N 19/587; H04N 19/61; H04N 19/188; H04N 19/30; H04N 19/426; H04N 19/523; H04N 5/23267; H04N 19/31; H04N 19/33; H04N 19/59; H04N 19/593; H04N 19/507; H04N 19/51; G06T 3/4046
USPC ........................................ 375/240.01–240.29
See application file for complete search history.

(56) References Cited

U.S. PATENT DOCUMENTS

| | | | |
|---|---|---|---|
| 2006/0039474 | A1 | 2/2006 | Tanaka et al. |
| 2013/0039428 | A1* | 2/2013 | Lakshman ............. H04N 19/80 375/E7.243 |
| 2014/0098883 | A1* | 4/2014 | Hannuksela ......... H04N 19/597 375/240.12 |
| 2017/0195672 | A1* | 7/2017 | He ....................... H04N 19/156 |

FOREIGN PATENT DOCUMENTS

| | | | |
|---|---|---|---|
| CN | 107155107 A | 9/2017 | |
| CN | 108769682 A | 11/2018 | |

\* cited by examiner

| ... | ... | ... | ... | ... | ... | ... |
|---|---|---|---|---|---|---|
| ... | C1 | c11 | A1 | a11 | B1 | b11 | ... |
| ... | c13 | c12 | a13 | a12 | b13 | b12 | ... |
| ... | C2 | c21 | A2 | a21 | B2 | b21 | ... |
| ... | c23 | c22 | a23 | a22 | b13 | b22 | ... |
| ... | C3 | c31 | A3 | a31 | B3 | b31 | ... |
| ... | c33 | c32 | a33 | a32 | b33 | b32 | ... |
| ... | ... | ... | ... | ... | ... | ... |

| C1 | ... | ... | ... | A1 | ... | ... | ... | B1 |
|---|---|---|---|---|---|---|---|---|
| ... | ... | ... | ... | ... | ... | ... | ... | ... |
| ... | ... | ... | ... | ... | ... | ... | ... | ... |
| ... | ... | ... | ... | ... | ... | ... | ... | ... |
| C2 | ... | ... | ... | A2 | a4 | a8 | a12 | B2 |
| ... | ... | ... | ... | a1 | a5 | a9 | a13 | ... |
| ... | ... | ... | ... | a2 | a6 | a10 | a14 | ... |
| ... | ... | ... | ... | a3 | a7 | a11 | a15 | ... |
| C3 | ... | ... | ... | A3 | ... | ... | ... | B3 |

METHOD AND APPARATUS FOR VIDEO ENCODING AND DECODING

CROSS-REFERENCE TO RELATED APPLICATION(S)

This application is a bypass continuation application of International Application No. PCT/CN2019/090002, filed on Apr. 4, 2019, which claims priority to Chinese Patent Application No. 201810638012.5, entitled "VIDEO ENCODING AND DECODING METHOD AND APPARATUS, COMPUTER DEVICE, AND STORAGE MEDIUM" filed with the China National Intellectual Property Administration, on Jun. 20, 2018, the disclosures of which are herein incorporated by reference in their entireties.

FIELD

The disclosure relates to the field of video encoding, and in particular, to a video encoding and decoding method and apparatus, a computer device, and a storage medium.

BACKGROUND

With the development of digital media technologies and computer technologies, videos are applied in various fields, such as mobile communication, network surveillance, and network television. With the improvement of hardware performance and screen resolution, users have increasing demand for high-definition videos.

With a limited bandwidth, a conventional encoder encodes video frames in the same way, and this may cause a problem that video quality in some scenarios is poor. For example, under the condition of 750 kbps of a bandwidth, when all video frames are encoded indiscriminately, the video frames can only be referenced to reference frames of the same resolution, resulting in low use efficiency of the reference frames.

SUMMARY

Example embodiments of the disclosure provide a video encoding and decoding method and apparatus, a computer device, and a storage medium, in which a current frame to be encoded may be encoded with reference to a reference frame even in a case that reference frames have different resolutions, to improve use efficiency of the reference frames, so that reference between video frames is more flexible, thereby solving the technical problem of low use efficiency of reference frames due to indiscriminate encoding of all video frames in the related art.

A video encoding method, performed by a computer device, the method including:
obtaining a reference frame corresponding to a current frame from a video input to be encoded;
determining a sampling manner corresponding to the current frame;
sampling the reference frame based on the sampling manner according to resolution information of the current frame, to obtain a target reference frame corresponding to the reference frame; and
encoding the current frame according to the target reference frame, to obtain encoded data corresponding to the current frame.

A video encoding apparatus, performed by a computer device, the apparatus including:
at least one memory configured to store program code; and
at least one processor configured to read the program code and operate as instructed by the program code, the program code including:
obtaining code configured to cause at least one of the at least one processor to obtain a reference frame corresponding to a current frame from a video input to be encoded;
determining code configured to cause at least one of the at least one processor to determine a sampling manner corresponding to the current frame;
sampling code configured to cause at least one of the at least one processor to sample the reference frame based on the sampling manner according to resolution information of the current frame, to obtain a target reference frame corresponding to the reference frame; and
encoding code configured to cause at least one of the at least one processor to encode the current frame according to the target reference frame, to obtain encoded data corresponding to the current frame.

A non-transitory computer-readable storage medium, storing a computer program, the computer program, when executed by at least one processor, causing the at least one processor to perform operations of the video encoding method.

A computer device, including at least one memory and at least one processor, the at least one memory storing a computer program, the computer program, when executed by the processor, causing the at least one processor to perform operations of the video encoding method.

According to the foregoing video encoding method and apparatus, the computer device and the storage medium, a sampling manner of a reference frame corresponding to a current frame to be encoded may be flexibly selected, so that the reference frame is sampled based on the sampled manner to obtain a target reference frame, and then the current frame to be encoded is encoded according to the target reference frame, thereby reducing the data amount of data to be encoded. The sampling manner of the reference frame may be selected flexibly to perform sampling and reconstruction on the reference frame and adjust a resolution of the reference frame. Therefore, the reference frame, even if having a resolution different from that of the current frame, may still be used as a reference frame, thereby improving the use efficiency of the reference frame, improving the accuracy of inter-frame prediction, reducing a prediction residual, and improving the quality of an encoded image.

A video decoding method, performed by a computer device, the method including:
determining a reference frame corresponding to a current frame from a video input to be decoded;
determining a sampling manner corresponding to the current frame;
sampling the reference frame based on the sampling manner according to resolution information of the current frame, to obtain a target reference frame corresponding to the reference frame; and
decoding the current frame according to the target reference frame, to obtain a reconstructed video frame corresponding to the current frame.

A video decoding apparatus, performed by a computer device, the apparatus including:
at least one memory configured to store program code; and at least one processor configured to read the program code and operate as instructed by the program code, the program code including:

obtaining code configured to cause at least one of the at least one processor to obtain a reference frame corresponding to a current frame from a video input to be decoded;

determining code configured to cause at least one of the at least one processor to determine a sampling manner corresponding to the current frame;

sampling code configured to cause at least one of the at least one processor to sample the reference frame based on the sampling manner according to resolution information of the current frame, to obtain a target reference frame corresponding to the reference frame; and decoding code configured to cause at least one of the at least one processor to decode the current frame according to the target reference frame, to obtain a reconstructed video frame corresponding to the current frame.

A non-transitory computer-readable storage medium, storing a computer program, the computer program, when executed by at least one processor, causing the at least one processor to perform operations of the video decoding method.

A computer device, including at least one memory and at least one processor, the memory storing a computer program, the computer program, when executed by the at least one processor, causing the at least one processor to perform operations of the video decoding method.

According to the foregoing video decoding method and apparatus, the computer device and the storage medium, a sampling manner of a reference frame corresponding to a current frame to be decoded may be flexibly selected, so that the reference frame is sampled based on the sampling manner to obtain a target reference frame, and then the current frame to be decoded is decoded according to the target reference frame to obtain a reconstructed video frame. The sampling manner of the reference frame may be selected flexibly to perform sampling and reconstruction on the reference frame and adjust a resolution of the reference frame. Therefore, the reference frame, even if having a resolution different from that of the current frame, may still be used as a reference frame, thereby improving the use efficiency of the reference frame, improving the accuracy of inter-frame prediction, reducing a prediction residual, and improving the quality of a decoded image.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

To make the objectives, technical solutions, and advantages of the disclosure clearer, the following further describes the disclosure in detail with reference to the accompanying drawings and the embodiments. It is to be understood that the specific embodiments described herein are only used to describe the disclosure, instead of limiting the disclosure.

It may be understood that the terms "first", "second" and the like used in the disclosure may be used for describing various elements in this specification. However, the elements are not limited by the terms unless otherwise specified. The terms are merely used to distinguish the first element from another element. For example, without departing from the scope of the disclosure, a first vector transformation coefficient may be referred to as a second vector transformation coefficient, and similarly, the second vector transformation coefficient may be referred to as the first vector transformation coefficient.

Throughout the disclosure, the expression "at least one of a, b and c" or "at least one of a, b, or c" indicates only a, only b, only c, both a and b, both a and c, both b and c, all of a, b, and c, or any combination(s) or variation(s) thereof.

Figure 1:
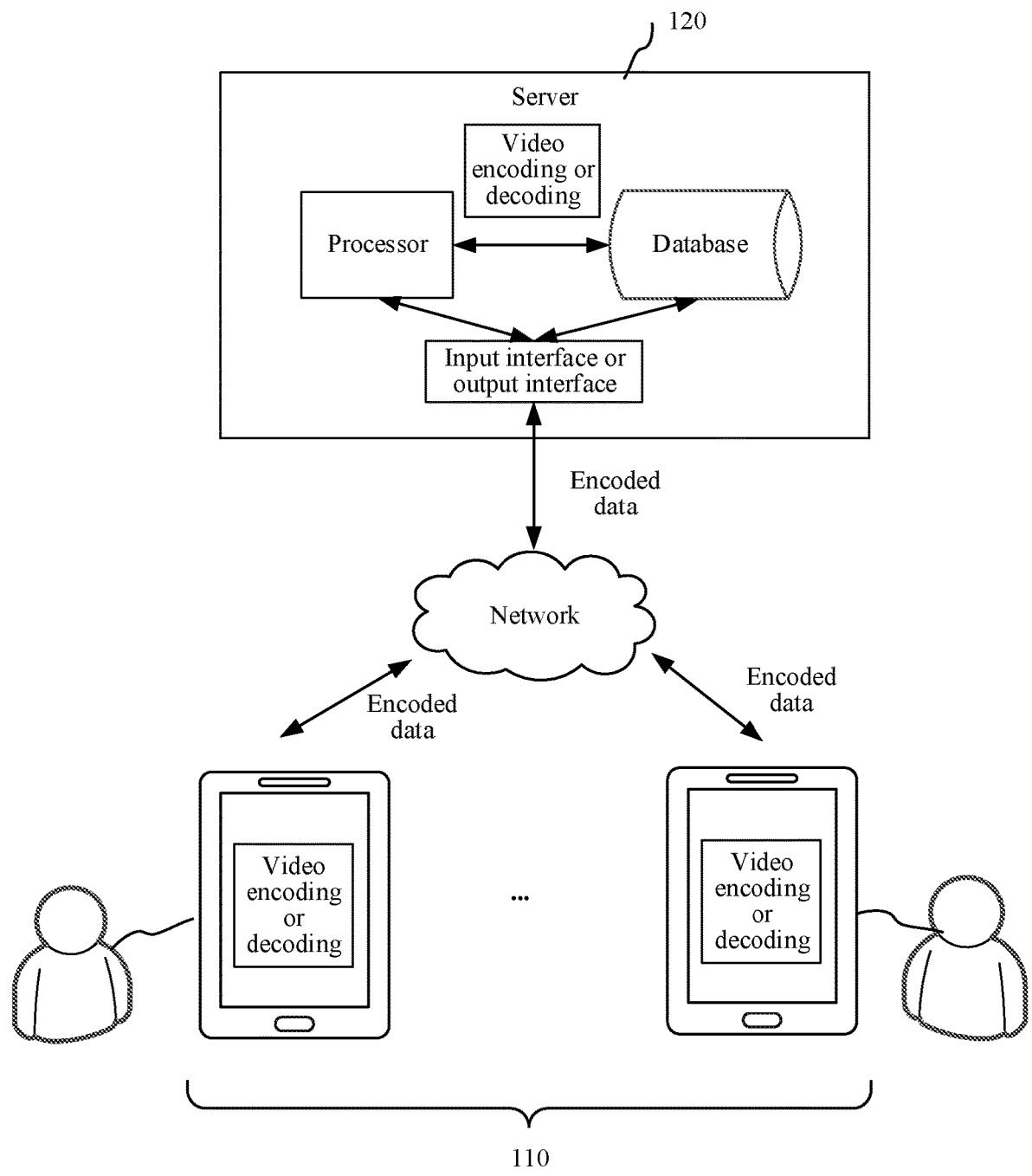
FIG. 1 is a diagram of an application environment of a video encoding method or a video decoding method according to an example embodiment.

FIG. 1 is a diagram of an application environment of a video encoding method and/or a video decoding method according to an example embodiment. As shown in FIG. 1, the application environment may include a terminal 110 and a server 120. The terminal 110 or the server 120 may perform video encoding by using an encoder or perform video decoding by using a decoder. The terminal 110 or the server 120 may also perform video encoding by using a processor running a video encoding program or video decoding by using a processor running a video decoding program. After receiving, through an input interface, encoded data sent by the terminal 110, the server 120 may directly transfer the encoded data to the processor for decoding, or may store the encoded data in a database for subsequent decoding. After an original video frame is encoded by using the processor to obtain encoded data, the server 120 may directly send the encoded data to the terminal 110 through an output interface, or may store the encoded data in a database for subsequent transfer.

The video encoding method and the video decoding method may be completed in the terminal 110 or the server 120. The terminal 110 may encode an input video frame by using the video encoding method, and then send encoded data to the server 120, or may receive, from the server 120, a decoded video frame that is obtained by decoding encoded data. The server 120 may encode a video frame. In this case, the video encoding method is completed in the server 120. If the server 120 needs to decode encoded data, the video decoding method is completed in the server 120. Alternatively, after receiving encoded data sent by the terminal 110, the server 120 may send the encoded data to a corresponding receiving terminal, so that the encoded data is decoded by the receiving terminal. It may be appreciated that, an encoder side and a decoder side may be the same side or different sides. The foregoing computer device, for example, the terminal or the server, may be the encoder side or the decoder side.

The terminal 110 is connected to the server 120 by using a network. The terminal 110 may be a desktop terminal or a mobile terminal, and the mobile terminal may be at least one of a mobile phone, a tablet computer, a notebook computer, and the like, but is not limited thereto. The server 120 may be implemented by using an independent server or a server cluster that includes a plurality of servers.

Figure 2:
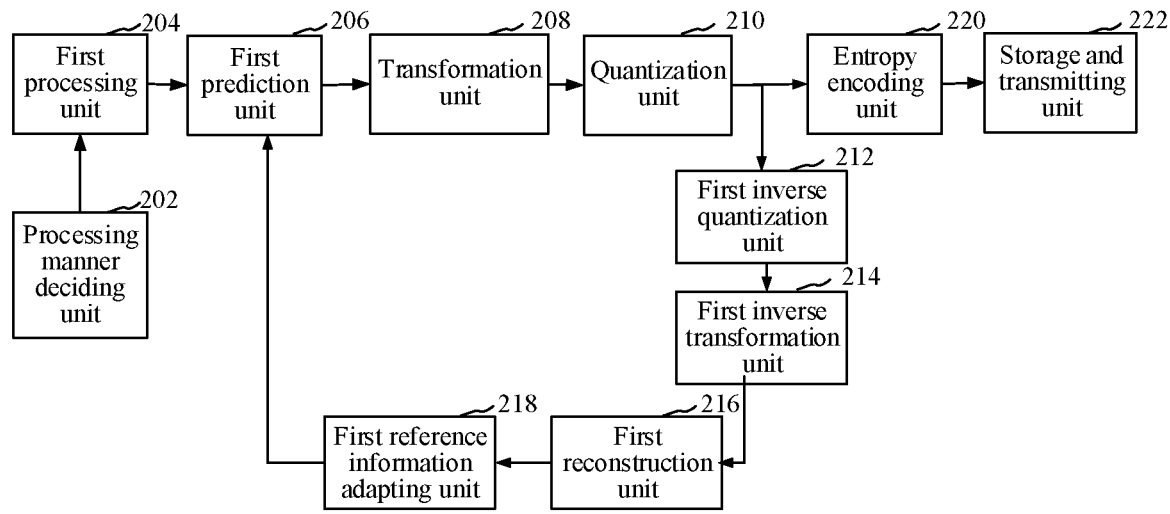
FIG. 2 is an encoding framework diagram corresponding to a video encoding method according to an example embodiment.

FIG. 2 is an encoding framework diagram corresponding to a video encoding method according to an example embodiment. In the video encoding method provided in this embodiment of the disclosure, input video frames of an input video sequence may be obtained and encoded, to obtain corresponding encoded data; the encoded data is stored or transmitted, by using a storage and transmitting unit 222. In a processing manner deciding unit 202, a processing manner of the input video frame may be determined, to obtain a processing manner corresponding to the input video frame. In a first processing unit 204, the input video frame may be processed according to the processing manner, to obtain a current frame to be encoded. In a first prediction unit 206, intra-frame prediction or inter-frame prediction may be performed on each code block of the current frame to be encoded at a resolution of the current frame to be encoded, and a predicted value and a corresponding motion vector are obtained according to an image value of a reference block corresponding to the code block. An actual value of the code block is subtracted from the predicted value to obtain a prediction residual, and the motion vector represents a displacement of the code block relative to the reference block. In a transformation unit 208, the prediction residual and vector information in a space domain are transformed into a frequency domain, and a transformation coefficient may be encoded. The transformation method may be discrete Fourier transform, discrete cosine transform or the like. The vector information may be an actual motion vector that represents a displacement, or a motion vector difference. The motion vector difference is a difference between an actual motion vector and a predicted motion vector.

In a quantization unit 210, transformed data is mapped to be another numeric value. For example, the transformed data may be divided by a quantization operation to obtain a smaller value. A quantization parameter is a sequence number corresponding to a quantization operation, and a corresponding quantization operation may be determined according to a quantization parameter. A small quantization parameter indicates reservation of most details of an image frame and a high corresponding bit rate. A great quantization parameter indicates a low corresponding bit rate, and great distortion and low quality of an image. A principle of quantization is expressed by using the following formula: $FQ=\text{round}(y/Q)$. y is a value corresponding to a video frame before quantization is performed, Q is a quantization operation, and FQ is a quantized value obtained by quantizing y. The round(x) function is used for performing rounding off to an even number on the quantized value, that is, Banker's rounding. A correspondence between the quantization parameter and the quantization operation may be specifically set according to a requirement. For example, in some current video encoding standards, for brightness encoding, the quantization operation has 52 values that are integers from 0 to 51. For chroma encoding, the quantization operation has values that are integers from 0 to 39. In addition, the quantization operation increases as the quantization parameter increases. Each time the quantization parameter is increased by 6, the quantization operation is doubled.

An entropy encoding unit 220 is configured to perform entropy encoding. The entropy encoding is a data encoding manner of encoding based on an entropy principle without losing any information, to express a certain amount of information with relatively few characters. An entropy encoding method may be, for example, Shannon encoding or Huffman encoding.

A first inverse quantization unit 212, a first inverse transformation unit 214, a first reconstruction unit 216 and a first reference information adapting unit 218 are units corresponding to a reconstruction path. A frame is reconstructed by using the units of the reconstruction path to obtain a reference frame, to ensure consistency of reference frames in encoding and decoding. An operation performed by the first inverse quantization unit 212 is an inverse process of quantization. An operation performed by the first inverse transformation unit 214 is an inverse process of the transformation that is performed by the transformation unit 208. The first reconstruction unit 216 is configured to add residual data obtained through inverse transformation to predicted data, to obtain a reconstructed reference frame. The first reference information adapting unit 218 is configured to perform, at the resolution of the current frame to be encoded, adaptive processing on at least one piece of the following reference information: the reference frame obtained through reconstruction, location information corresponding to each code block of the current frame to be encoded, location information corresponding to each reference block of the reference frame, and a motion vector, so that the first prediction unit 206 performs prediction according to the reference information on which the adaptive processing has been performed.

Figure 3:
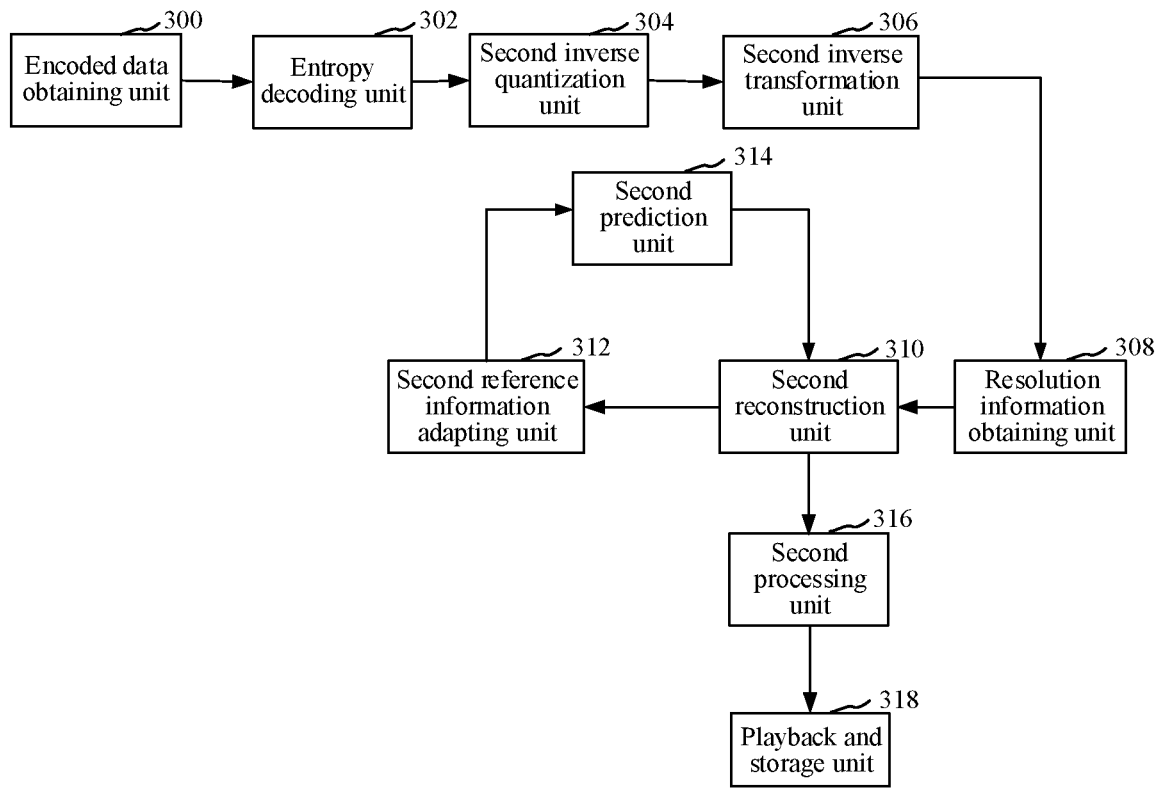
FIG. 3 is a decoding framework diagram corresponding to a video decoding method according to an example embodiment.

FIG. 3 is a decoding framework diagram corresponding to a video decoding method according to an example embodiment. According to the video decoding method provided in this embodiment of the disclosure, encoded data corresponding to each current frame to be decoded of a to-be-decoded video sequence is obtained by an encoded data obtaining unit 300; after an entropy decoding unit 302 performs entropy decoding, entropy-decoded data is obtained; a second inverse quantization unit 304 performs inverse quantization on the entropy-decoded data, to obtain inversely quantized data; a second inverse transformation unit 306 performs inverse transformation on the inversely quantized data, to obtain inversely transformed data. The inversely transformed data may be consistent with the data that is obtained after inverse transformation performed by the first inverse transformation unit 214 in FIG. 2. A resolution information obtaining unit 308 is configured to obtain resolution information corresponding to the current frame to be decoded. A second reference information adapting unit 312 is configured to obtain a reference frame reconstructed by a second reconstruction unit, perform adaptive processing on at least one piece of the following reference information: the reference frame, location information corresponding to each to-be-decoded block of the current frame to be decoded, location information corresponding to each reference block of the reference frame, and a motion vector according to the resolution information of the current frame to be decoded, and perform prediction according to the information on which the adaptive processing has been performed. A second prediction unit 314 obtains a reference block corresponding to the to-be-decoded block according to the reference information obtained after the adaptive processing, and obtain, according to an image value of the reference block, a predicted value consistent with the predicted value in FIG. 2. A second reconstruction unit 310 performs reconstruction according to the predicted value and inversely transformed data, that is, a prediction residual, to obtain a reconstructed video frame. A second processing unit 316 processes the reconstructed video frame according to the resolution information corresponding to the current frame to be decoded, to obtain a corresponding decoded video frame. A playback and storage unit 318 may play or store, or play and store the decoded video frame.

Figure 4:
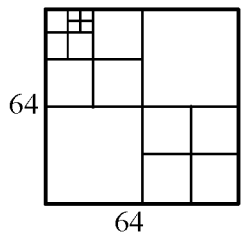
FIG. 4 is a schematic diagram corresponding to a code block according to an example embodiment.

It may be appreciated that the foregoing encoding framework diagram and decoding framework diagram are merely examples, and do not limit the encoding method and the decoding method to which the solution of the disclosure is applied. A specific encoding framework diagram and decoding framework diagram may include more or fewer units than those shown in the figure, or some units may be combined, or a different component and unit deployment may be used. For example, loop filtering may further be performed on the reconstructed video frame, to reduce a blocking artifact of the video frame and improve video quality. The current frame to be encoded may be divided into a plurality of code blocks, and a size of the code block may be set according to a requirement or obtained through calculation. For example, the size of each code block may be 8×8 pixels. Alternatively, rate-distortion costs corresponding to various code block division manners may be calculated, to select a division manner with a small rate-distortion cost for code block division. FIG. 4 is a schematic diagram of division of a 64×64 pixel image block, where one cube represents one code block. It can be learned from FIG. 4 that sizes of code blocks may include 32×32 pixels, 16×16 pixels, 8×8 pixels, and 44 pixels. The code blocks may have other sizes, for example, 32×16 pixels or 64×64 pixels. It may be appreciated that during decoding, because code blocks correspond to to-be-decoded blocks in a one-to-one manner, pixel sizes of the to-be-decoded blocks may also include 32×32 pixels, 16×16 pixels, 8×8 pixels, 4×4 pixels, and the like.

In a possible application scenario, the video encoding method and the video decoding method provided in the embodiments of the disclosure may be applied to an application having a video call function, and the application may be a social application or an instant messaging application. When two terminals installed with the application perform a video call process, a first terminal acquires a video frame through a camera, then encodes the video frame by using a video encoding function of the application to obtain encoded data, and sends the encoded data to a back-end server of the application, so that the back-end server forwards the encoded data to a second terminal. After receiving the encoded data, the second terminal decodes the encoded data by using a video decoding function of the application, reconstructs the encoded data to obtain a video frame, and then displays the video frame. Similarly, the second terminal may send, through the back-end server, encoded data obtained through encoding to the first terminal, and the first terminal performs decoding and display, thereby implementing a video call between the two parties.

In another possible application scenario, the video encoding method and the video decoding method provided in the embodiments of the disclosure may be applied to an application having a video playback function, and the application may be a live video application, a short video application or a video playback application. A terminal installed with the application may acquire a video frame through a camera, then encode the video frame by using a video encoding function of the application to obtain encoded data, and send the encoded data to a back-end server of the application. When another terminal requests to watch the video, the back-end server sends the encoded data of the video to the another terminal, and the application in the another terminal decodes the encoded data, thereby playing the video.

It should be understood that the foregoing several possible application scenarios are only used as examples for description. The video encoding method and the video decoding method provided in the embodiments of the disclosure may also be applied to other scenarios that require video encoding and decoding, and this is not limited in the embodiments of the disclosure.

Figure 5:
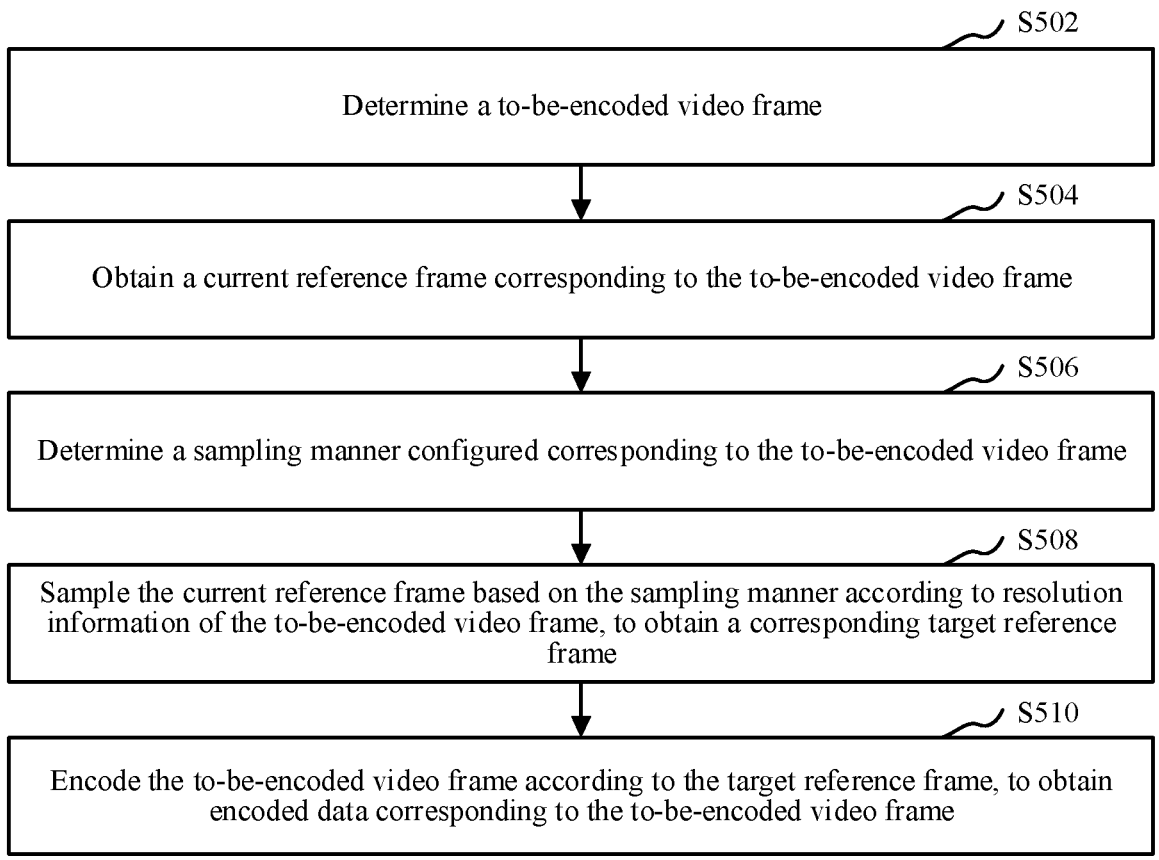
FIG. 5 is a schematic flowchart of a video encoding method according to an example embodiment.

As shown in FIG. 5, in an example embodiment, a video encoding method is provided. This embodiment is described by using an example in which the method is applied to the terminal 110 or the server 120 in FIG. 1. Referring to FIG. 5, the video encoding method includes the following operations S502-S510.

S502. Determine a current frame to be encoded.

The current frame to be encoded is obtained after an input video frame is processed. When a processing manner used by an encoder side for processing the input video frame includes a full-resolution processing manner, the input video frame may be used as the current frame to be encoded. When a processing manner used by the encoder side for processing the input video frame includes a downsampling processing manner, the input video frame may be downsampled to obtain the current frame to be encoded. For example, when a resolution of the input video frame is 800×800 pixels and the processing manner is 1/2 downsampling in both a horizontal direction and a vertical direction, a resolution of the current frame to be encoded obtained after downsampling is 400×400 pixels.

The input video frame is a basic unit forming a video, and one video sequence may include a plurality of video frames. The input video frame may be a video frame acquired in real time, for example, a video frame obtained in real time through a camera of a terminal, or a video frame corresponding to a stored video. The input video frame may be an I frame, a P frame, or a B frame, where the I frame is an intra-predicted frame, the P frame is a forward predicted frame, and the B frame is a bi-directional predicted frame.

S504. Obtain a reference frame corresponding to the current frame to be encoded.

The reference frame is a video frame used as a reference during encoding of the current frame to be encoded. The reference frame is a video frame obtained by reconstructing encoded data corresponding to a video frame that may be used as a reference frame. According to different inter-frame prediction types, the reference frame corresponding to the current current frame to be encoded may be a forward reference frame or a bi-directional reference frame, and there may be one or more reference frames corresponding to the current frame to be encoded.

For example, when the current frame to be encoded is a P frame, there may be one corresponding reference frame. For example, when the current frame to be encoded is a B frame, there may be two corresponding reference frames. The reference frame corresponding to the current frame to be encoded may be obtained according to a reference relationship, and the reference relationship may vary according to various video encoding and decoding standards. For example, if a second video frame in a group of pictures (GOP) is a B frame, corresponding reference frames may be an I frame of the GOP and the fourth frame of the GOP. Alternatively, the reference frame corresponding to the current frame to be encoded may be the first one or two frames in forward encoded frames of the current frame to be encoded.

In an example embodiment, the obtaining a reference frame corresponding to the current frame to be encoded includes: obtaining a first reference rule, where the first reference rule includes a relationship between resolution values of the current frame to be encoded and a reference frame; and obtaining the reference frame corresponding to the current frame to be encoded according to the first reference rule.

Optionally, the first reference rule determines a restriction relationship between the resolution values of the current frame to be encoded and the reference frame. The relationship between the resolution values includes at least one of the following: resolutions of the current frame to be encoded and the reference frame are the same, and resolutions of the current frame to be encoded and the reference frame are different. When the first reference rule includes that the resolutions of the current frame to be encoded and the reference frame are the same, the first reference rule may further include a processing manner reference rule for the resolutions of the current frame to be encoded and the reference frame.

For example, the processing manner reference rule may include one or two of the following: a current frame to be encoded in a full-resolution processing manner may be referenced to a reference frame in the full-resolution processing manner; and a current frame to be encoded in a downsampling processing manner may be referenced to a reference frame in the downsampling processing manner. When the first reference rule includes that the resolutions of the current frame to be encoded and the reference frame are different, the first reference rule may further include one or two of the following: the resolution of the current frame to be encoded is greater than the resolution of the reference frame, and the resolution of the current frame to be encoded is less than the resolution of the reference frame. The first reference rule may include one or more of the following: an original-resolution current frame to be encoded may be referenced to a downsampled-resolution reference frame; a downsampled-resolution current frame to be encoded may be referenced to an original-resolution reference frame; an original-resolution current frame to be encoded may be referenced to an original-resolution reference frame; and a downsampled-resolution current frame to be encoded may be referenced to a downsampled-resolution reference frame. The original-resolution current frame to be encoded means that the resolution of the current frame to be encoded is the same as the resolution of the corresponding input video frame. The original-resolution reference frame means that the resolution of the reference frame is the same as the resolution of the corresponding input video frame. The downsampled-resolution current frame to be encoded means that the current frame to be encoded is obtained by downsampling the corresponding input video frame. The downsampled-resolution reference frame means that the reference frame is obtained by downsampling the corresponding reference frame.

Optionally, after obtaining the first reference rule, the encoder side or the decoder side may determine the reference frame corresponding to the current frame to be encoded according to the first reference rule, and make the reference frame meet the first reference rule.

In an example embodiment, the encoder side may further add, to encoded data corresponding to the input video frame, rule information corresponding to the first reference rule. During decoding, the decoder side may read the rule information from the encoded data, to perform corresponding processing according to a second reference rule corresponding to the encoder side.

Optionally, the rule information may be used for describing the used first reference rule, and a flag Resolution_Referencer_Rules for describing a processing manner may be added to the encoded data. A specific value of the flag may be set according to a requirement. An adding position of the rule information in the encoded data may be group-level header information or sequence-level header information. The adding position of the rule information in the encoded data may be determined based on the first reference rule. For example, when the first reference rule is that an original-resolution current frame to be encoded may be referenced to a downsampled-resolution reference frame, the corresponding Resolution_Referencer_Rules may be 1; when the first reference rule is that a downsampled-resolution current frame to be encoded may be referenced to a downsampled-resolution reference frame, the corresponding Resolution_Referencer_Rules may be 2. If the video frame sequence uses the same first reference rule, the adding position of the rule information in the encoded data may be the sequence-level header information. If various GOPs of the video frame sequence may use different first reference rules, the adding position of the rule information in the encoded data may be the group-level header information.

In an example embodiment, after obtaining the encoded data corresponding to the reference frame, the encoder side may perform entropy decoding, inverse quantization and inverse transformation on the encoded data, to obtain a prediction residual corresponding to each intra-frame prediction block, and then add up the prediction residual and a corresponding reference block to obtain each reconstructed block, thereby obtaining a reconstructed video frame of the input video frame, that is, the reference frame.

S506. Determine a sampling manner configured corresponding to the current frame to be encoded.

The sampling manner is a manner for sampling the video frame, and may include a sampling ratio and/or a sampling method. In this embodiment, the sampling manner may be a sampling manner for sampling the reference frame. The sampling the reference frame includes upsampling or downsampling the reference frame. The sampling ratio is a ratio obtained by dividing a resolution after the sampling by a resolution before the sampling. An upsampling ratio is a numeric value greater than 1, and a downsampling ratio is a numeric value less than 1.

Optionally, there may be a plurality of sampling methods, for example, bilinear interpolation, bicubic interpolation, a convolutional neural network (CNN)-based algorithm, or a method based on statistical characteristics. In the CNN-based algorithm, when the reference frame needs to be upsampled, upsampling may be performed by using a super-resolution reconstruction model (such as a super-resolution CNN model) to reconstruct the reference frame. The method based on statistical characteristics may be, for example, a nearest neighbor interpolation method, a mean interpolation method, or a median interpolation method.

In an example embodiment, the encoder side and the decoder side may agree on a fixed sampling method, and the reference frame is sampled according to the agreed sampling method. In an example embodiment, the encoder side may alternatively select an appropriate sampling method from a plurality of preset sampling methods as a sampling manner corresponding to the current current frame to be encoded.

In an example embodiment, the encoder side or the decoder side may determine the sampling manner corresponding to the current frame to be encoded according to local hardware information of a device that performs the video encoding method and/or image feature information of the current frame to be encoded. The local hardware information is information related to hardware of a computer device that performs the video encoding/video decoding method, and may include related information about a central processing unit (CPU), a memory, a mainboard, a drive, and the like.

In an example embodiment, the method for sampling the reference frame may be obtained according to a processor capacity of a device, such as a terminal or a server, performing the video encoding or video decoding method. A device with a high processor processing capacity corresponds to a high-complexity sampling method, and a device with a low processor processing capacity corresponds to a low-complexity sampling method. A correspondence between processor processing capacities and sampling methods may be set. When encoding needs to be performed, a processor processing capacity is obtained, and a corresponding sampling method is obtained according to the processor processing capacity. For example, it may be specified that a sampling ratio corresponding to a 16-bit processor is 1/8, and a downsampling ratio corresponding to a 32-bit processor is 1/4. For example, bicubic interpolation is more complex than bilinear interpolation. Therefore, it may be specified that a downsampling method corresponding to the 16-bit processor is bilinear interpolation, and a downsampling method corresponding to the 32-bit processor is bicubic interpolation.

In an example embodiment, the method for sampling the reference frame may alternatively be determined according to image feature information of the current frame to be encoded or the current frame to be decoded. The image feature information refers to information related to image content of the video frame, and includes image content, image motion information, and image texture information such as an edge. The image feature information reflects a scenario corresponding to the video frame, detail complexity, motion intensity, and the like. For a video frame having a large amount of complex image feature information, a sampling method with high sampling method complexity may be selected during sampling of the reference frame. For a video frame having a small amount of simple image feature information, a sampling method with low sampling method complexity may be selected during sampling of the reference frame. A correspondence between content of a current frame to be encoded and a sampling method may be set. When a video frame is to be encoded, image feature information of the current frame to be encoded may be determined in advance, and a corresponding sampling method is obtained according to the image feature information of the current frame to be encoded.

In an example embodiment, during determining of the sampling manner for sampling the reference frame, hardware information of the encoder side or the decoder side and the image feature information may be considered, alone or in combination, to select a most appropriate current sampling manner.

In an example embodiment, the video encoding method further includes: adding, to encoded data corresponding to the reference frame, sampling manner information corresponding to the sampling of the reference frame.

Optionally, the sampling manner information is used for describing a sampling manner for sampling the reference frame, and a flag Sampling_Method for describing the sampling manner may be added to the encoded data. A value of the flag corresponding to each sampling manner may be set according to a requirement. For example, when the sampling manner is bilinear interpolation, the corresponding Sampling_Method may be 0; when the sampling manner is bicubic interpolation, the corresponding Sampling_Method may be 1.

In an example embodiment, the sampling manner information may be added to header information corresponding to the encoded data. For example, the encoder side may add the encoded data to a preset position of frame-level header information, group-level header information, or sequence-level header information. The frame-level header information is header information of encoded data corresponding to an input frame, the group-level header information refers to header information of encoded data corresponding to a video frame group, and the sequence-level header information refers to header information of encoded data corresponding to a video frame sequence. One video frame sequence may include a plurality of GOPs, and one GOP may include a plurality of video frames. The sampling manner information may be added to header information of different ranges according to actual requirements, to act on video frames of different ranges. If the video frame sequence uses the same sampling manner, the adding position of the sampling manner information in the encoded data may be the sequence-level header information. If various GOPs of the video frame sequence use different sampling manners, the adding position of the sampling manner information in the encoded data may be the group-level header information.

Figures 6, 7:
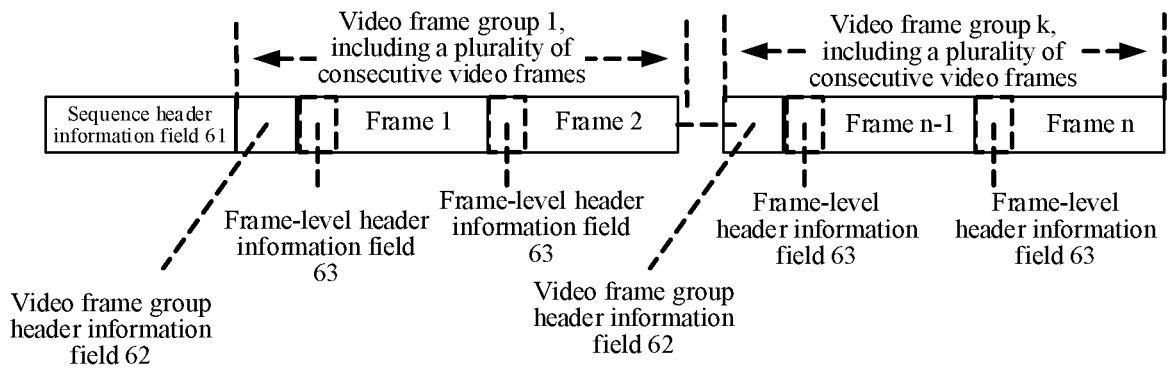
FIG. 6 is a structural block diagram of a video frame sequence according to an example embodiment.
FIG. 7(1) and FIG. 7(2) are schematic diagrams of interpolation on an intermediate reference frame according to an example embodiment.

FIG. 6 is a structural block diagram of a video frame sequence according to an example embodiment. Blocks indicated by dashed lines in FIG. 6 represent frame-level header information of encoded data corresponding to each input video frame; frames represent encoded data corresponding to the first video frame, the second video frame and an $n^{th}$ video frame respectively. It can be learned from FIG. 6 that, the encoder side may add the sampling manner information to header information corresponding to the encoded data, for example, a frame-level header information field 63, a video frame group header information field 62, or a sequence header information field 61 in FIG. 6, to act on video frames of different ranges.

In an example embodiment, the encoder side may add, to the encoded data, a flag Up_Sampling_Method for describing a sampling manner corresponding to upsampling of the reference frame. A value of the flag corresponding to each sampling manner that corresponds to the upsampling may be set according to a requirement. For example, when the sampling manner for upsampling the reference frame is bilinear interpolation, the corresponding Up_Sampling_Method may be 0; when the sampling manner for upsampling the reference frame is bicubic interpolation, the corresponding Up_Sampling_Method may be 1; when the sampling manner for upsampling the reference frame is a super-resolution reconstruction model method, the corresponding Up_Sampling_Method may be 2, and so on. The encoder side may add, to the header information corresponding to the encoded data, the sampling manner information about upsampling of the reference frame. For example, the sampling manner information may be added to a preset position of the frame-level header information, the group-level header information, or the sequence-level header information.

In an example embodiment, the reference frame may be downsampled in a case that a resolution indicated by the resolution information of the current frame to be encoded is less than a resolution indicated by resolution information of the reference frame. In this case, the current frame to be encoded is obtained by processing the input video frame in a downsampling processing manner. The encoder side or the decoder side may obtain a corresponding downsampling method and downsampling ratio for downsampling the input video frame. The reference frame is downsampled according to the obtained downsampling method and downsampling ratio, to obtain a target reference frame.

In an example embodiment, the encoder side and the decoder side may set, in respective encoding/decoding rules, sampling manners for sampling the reference frame, which the used sampling manners need to be consistent with. The encoder side adds, to corresponding encoded data, sampling manner information about sampling of the reference frame, so that the decoder side may read the corresponding sampling manner information during decoding, and use the corresponding sampling manner to sample the reference frame at the decoder side.

In an example embodiment, a sampling method for sampling the reference frame matches a sampling algorithm for downsampling the input video frame to obtain the current frame to be encoded. To be specific, if the reference frame needs to be downsampled, the downsampling algorithm is the same as the downsampling algorithm for downsampling the input video frame to obtain the to-be-encoded frame. If the reference frame needs to be upsampled, an upsampling algorithm is a sampling algorithm matching the downsampling algorithm for downsampling the input video frame to obtain the current to-be-encoded frame.

S508: Sample the reference frame based on the sampling manner according to resolution information of the current frame to be encoded, to obtain a corresponding target reference frame.

The resolution information is information related to a resolution, and may be, for example, the resolution itself or a downsampling ratio. The target reference frame is a video frame obtained after the reference frame is sampled according to the corresponding sampling manner. Optionally, the encoder side may sample the reference frame based on the sampling manner according to the resolution information of the current frame to be encoded, to obtain a target reference frame having a resolution consistent with that of the current frame to be encoded.

In an example embodiment, in a case that a resolution indicated by the resolution information of the current frame to be encoded is greater than a resolution indicated by resolution information of the reference frame, the reference frame is upsampled based on the sampling manner according to the resolution information of the current frame to be encoded, to obtain the corresponding target reference frame.

Optionally, the reference frame may be upsampled by using, for example, an interpolation method, where based on original image pixels, new elements are inserted between pixel points by using an appropriate interpolation algorithm. That the resolution indicated by the resolution information of the current frame to be encoded is greater than the resolution indicated by the resolution information of the reference frame may be that: a current frame to be encoded in a full-resolution manner is referenced to a reference frame processed in a downsampling manner; alternatively, a current frame to be encoded processed in a downsampling manner is referenced to a reference frame processed in a downsampling manner, and a downsampling ratio of the current frame to be encoded is greater than a downsampling ratio of the reference frame.

In an example embodiment, the determining a sampling manner configured corresponding to the current frame to be encoded includes: determining, according to local hardware information and/or image feature information of the current frame to be encoded, a sampling manner for upsampling the reference frame.

In an example embodiment, the encoder side may upsample the reference frame in a case that the resolution indicated by the resolution information of the current frame to be encoded is greater than the resolution indicated by the resolution information of the reference frame. A sampling manner for upsampling the reference frame may be determined according to the local hardware information and/or the image feature information of the current frame to be encoded. For example, a device with a high processor processing capacity corresponds to a high-complexity upsampling method, and a device with a low processor processing capacity corresponds to a low-complexity upsampling method. For another example, for a video frame having a large amount of complex image feature information, a sampling method with high sampling method complexity may be selected during upsampling of the reference frame. For a video frame having a small amount of simple image feature information, a sampling method with low sampling method complexity may be selected during upsampling of the reference frame. Alternatively, the local hardware information of the device that performs video encoding and image features of the current frame to be encoded may be considered in combination, to select a most appropriate current upsampling manner.

In an example embodiment, the reference frame may be upsampled in a case that the resolution indicated by the resolution information of the current frame to be encoded is greater than the resolution indicated by the resolution information of the reference frame. Optionally, the reference frame may be upsampled based on the configured sampling manner according to the resolution information of the current frame to be encoded, to obtain a target reference frame having a resolution consistent with that of the current frame to be encoded.

In an example embodiment, in a case that the resolution indicated by the resolution information of the current frame to be encoded is less than the resolution indicated by the resolution information of the reference frame, the reference frame is downsampled based on the sampling manner according to the resolution information of the current frame to be encoded, to obtain the corresponding target reference frame.

Optionally, that the resolution indicated by the resolution information of the current frame to be encoded is less than the resolution indicated by the resolution information of the reference frame may be that: a current frame to be encoded processed in a downsampling manner is referenced to a reference frame in a full-resolution manner; alternatively, a current frame to be encoded processed in a downsampling manner is referenced to a reference frame processed in a downsampling manner, and a downsampling ratio of the current frame to be encoded is less than a downsampling ratio of the reference frame.

For example, it is assumed that the resolution of the current frame to be encoded is 400×800 pixels, and the resolution of the reference frame is 800×1600 pixels. In this case, the reference frame may be downsampled according to the resolution of the current frame to be encoded, to obtain a corresponding target reference frame, and then video encoding is performed according to the target reference frame. For example, 1/2 downsampling is performed on a width and a height of the reference frame, to obtain the target reference frame with a resolution of 400×800 pixels.

In an example embodiment, the reference frame is downsampled in a case that the resolution indicated by the resolution information of the current frame to be encoded is less than the resolution indicated by the resolution information of the reference frame. Optionally, the reference frame may be downsampled according to a downsampling method corresponding to the current frame to be encoded that is processed in a downsampling manner, to obtain a target reference frame having a resolution consistent with that of the current frame to be encoded.

In an example embodiment, the reference frame may not be downsampled in a case that the resolution indicated by the resolution information of the current frame to be encoded is less than the resolution indicated by the resolution information of the reference frame. Sub-pixel interpolation processing is directly performed on the reference frame, to obtain the target reference frame.

In an example embodiment, the reference frame may not be sampled in a case that the resolution indicated by the resolution information of the current frame to be encoded is equal to the resolution indicated by the resolution information of the reference frame. Sub-pixel interpolation processing is directly performed on the reference frame, to obtain the target reference frame.

S510. Encode the current frame to be encoded according to the target reference frame, to obtain encoded data corresponding to the current frame to be encoded.

Optionally, the current frame to be encoded may be encoded under the resolution of the current frame to be encoded. The encoding may include at least one of prediction, transformation, quantization, and entropy encoding. When the to-be-encoded frame is a P frame and a B frame, the encoder side may obtain a reference frame corresponding to the current frame to be encoded, and sample the reference frame according to a determined sampling manner, to obtain a target reference frame. The encoder side may perform prediction according to the target reference frame to obtain a prediction residual, and perform transformation, quantization, entropy encoding, and the like on the prediction residual to obtain encoded data corresponding to the input video frame. In a process of obtaining the encoded data, according to the resolution of the to-be-encoded frame, processing is performed on at least one of the following: the target reference frame, location information corresponding to each code block of the to-be-encoded frame, location information corresponding to each reference block of the target reference frame, and a motion vector.

For example, during calculation of the prediction residual, the reference frame may be sampled according to the resolution information of the current frame to be encoded, to obtain a target reference frame having a resolution consistent with that of the current frame to be encoded. Then, reference blocks corresponding to code blocks in the current frame to be encoded are obtained from the target reference frame. Prediction is performed according to the reference blocks, to obtain predicted values corresponding to the code blocks. Then, prediction residuals are obtained according to differences between actual values and the predicted values of the code blocks. During calculation of a motion vector value, if the reference frame has a different resolution, location information of the code block or location information of a decoded block may be transformed according to the resolutions of the reference frame and the current frame to be encoded. Then, the motion vector value is obtained according to the transformed location information.

In an example embodiment, the encoding the current frame to be encoded under the resolution of the current frame to be encoded to obtain encoded data corresponding to the input video frame includes: obtaining an encoding manner corresponding to the encoding of the current frame to be encoded under the resolution of the current frame to be encoded; and adding, to the encoded data corresponding to the input video frame, encoding manner information corresponding to the encoding manner.

Optionally, the encoding manner is a processing manner related to encoding performed by the encoder side. For example, the encoding manner may include one or more of the following: an upsampling manner used by a video frame after decoding and reconstruction of the reference frame during encoding, a rule corresponding to a reference rule, and sub-pixel interpolation on the reference frame. The encoding manner information corresponding to the encoding manner is added to the encoded data corresponding to the input video frame, so that the decoder side may decode a current frame to be decoded according to the encoding manner information.

In an example embodiment, the encoding manner information corresponding to the encoding manner may not be added to the encoded data. Instead, an encoding manner is preset in the encoder side and the decoder side, and a decoding manner corresponding to the encoding manner is set in the decoder side. Alternatively, the encoder side and the decoder side may obtain corresponding encoding manner and decoding manner through calculation according to the same algorithm or corresponding algorithms. For example, it is preset in an encoding and decoding standard that a method used by the encoder side for upsampling the reference frame is the same as a method used by the decoder side for upsampling the reference frame.

In an example embodiment, the encoding the current frame to be encoded according to the target reference frame to obtain encoded data corresponding to the current frame to be encoded includes: determining a first vector transformation parameter according to the resolution information of the current frame to be encoded and first resolution information, where the first resolution information includes target motion vector unit resolution information corresponding to the input video frame. Target motion vectors corresponding to the code blocks in the current frame to be encoded are obtained according to the first vector transformation parameter.

Optionally, the first vector transformation parameter is used for transforming a motion vector or location information for obtaining a motion vector. The first vector transformation parameter may be a ratio between the resolution information of the current frame to be encoded and the first resolution information, and may be obtained by dividing the resolution information of the current frame to be encoded by the first resolution information. Alternatively, the first vector transformation parameter may be obtained by dividing the first resolution information by the resolution information of the current frame to be encoded. Alternatively, after the ratio is obtained, the ratio may be multiplied by a corresponding coefficient or added with a preset offset to obtain the first vector transformation parameter. For example, it is assumed that a downsampling ratio of the reference frame is 1/3, and a downsampling ratio of the current frame to be encoded is 1/6. In this case, the first vector transformation parameter may be 1/3 divided by 1/6, that is, 2.

Further, after obtaining the first vector transformation parameter, the encoder side transforms the obtained motion vector or the location information corresponding to the motion vector according to the first vector transformation parameter, to obtain the target motion vector.

In an example embodiment, the operation of determining a first vector transformation parameter according to the resolution information of the current frame to be encoded and first resolution information includes: obtaining target motion vector unit resolution information; and determining the first vector transformation parameter according to the resolution information of the current frame to be encoded and the target motion vector unit resolution information.

Optionally, the target motion vector unit resolution information refers to information related to a resolution corresponding to a unit of the target motion vector, and may be, for example, a resolution or a downsampling ratio. The resolution corresponding to the unit of the target motion vector means that the unit of the target motion vector is calculated by using a vector unit under the resolution as a standard. The current frame to be encodeds may have one or more resolutions. For example, among all current frame to be encodeds corresponding to an input video sequence, some may have resolutions the same as an original resolution of input video frames, while other current frame to be encodeds may have resolutions lower than the original resolution of the input video frames. Therefore, the resolution corresponding to the unit of the target motion vector needs to be determined. The resolution corresponding to the unit of the target motion vector may be set before encoding or obtained according to a parameter of an encoding process, and may be specified as appropriate.

In an example embodiment, the resolution corresponding to the unit of the target motion vector may be the resolution corresponding to the input video frame, that is, the original resolution, or the resolution corresponding to the unit of the target motion vector may be the resolution corresponding to the current frame to be encoded. The first vector transformation parameter may be a ratio between resolution information corresponding to the unit of the target motion vector and the resolution information of the current frame to be encoded. For example, it is assumed that the resolution corresponding to the unit of the target motion vector is the original resolution, a sampling ratio corresponding to the unit of the target motion vector is 1, and a sampling ratio of the resolution of the current frame to be encoded is 1/2. In this case, the first vector transformation parameter may be 1 divided by 1/2, that is, 2. Alternatively, it is assumed that the resolution corresponding to the unit of the target motion vector is the original resolution, which is 900×900 pixels; the resolution of the current frame to be encoded is 450×600 pixels; and there may be two first vector transformation parameters: a first vector transformation parameter in a horizontal direction and a first vector transformation parameter in a vertical direction. In this case, the first vector transformation parameter in the horizontal direction is 900/450=2, and the first vector transformation parameter in the vertical direction is 900/600=1.5.

In an example embodiment, the encoder side may obtain the target motion vector unit resolution information according to a computing power of a device performing encoding. For example, when the device performing encoding can only perform integer calculation or it takes a long calculation time in the case of calculating a decimal value, the resolution corresponding to the unit of the target motion vector may be the resolution corresponding to the input video frame. When the device performing encoding can perform decimal calculation quickly, the resolution corresponding to the unit of the target motion vector may be the resolution corresponding to the current frame to be encoded.

In an example embodiment, when the first vector transformation parameter is determined according to the resolution information of the current frame to be encoded and the target motion vector unit resolution information, the operation of obtaining target motion vectors corresponding to the code blocks in the current frame to be encoded according to the first vector transformation parameter includes: obtaining a first motion vector according to a displacement between a current code block and a corresponding target reference block; and obtaining a target motion vector corresponding to the current code block according to the first vector transformation parameter and the first motion vector.

Optionally, the first motion vector is obtained according to the displacement between the current code block and the corresponding target reference block. The target reference block may be obtained from the target reference frame that is obtained after the reference frame is processed. After the first motion vector is obtained, the first vector transformation parameter may be multiplied by the first motion vector, and an obtained product is used as the target motion vector. It is assumed that the resolution corresponding to the unit of the target motion vector is the original resolution. Because the unit of the target motion vector is the original resolution while the first motion vector is obtained through calculation under the resolution of the current frame to be encoded, the first motion vector needs to be transformed. If the first vector transformation parameter is equal to 2, and the obtained first motion vector is (2, 2), the target motion vector is (4, 4). After the target motion vector is obtained, encoding may be performed according to the target motion vector. For example, the target motion vector and the prediction residual corresponding to the current code block may be encoded, to obtain encoded data.

In an example embodiment, when the resolution information of the current frame to be encoded is consistent with the target motion vector unit resolution information, the first vector transformation parameter is 1, and the first motion vector is the same as the target motion vector. Therefore, the operation of determining a first vector transformation parameter according to the resolution information of the current frame to be encoded and first resolution information, where the first resolution information includes target motion vector unit resolution information corresponding to the input video frame may be omitted, and the first motion vector is directly used as the target motion vector. When the resolution information of the current frame to be encoded is inconsistent with the target motion vector unit resolution information, the operation of determining a first vector transformation parameter according to the resolution information of the current frame to be encoded and first resolution information, where the first resolution information includes target motion vector unit resolution information corresponding to the input video frame is performed.

In an example embodiment, when the current frame to be encoded and the target reference frame have different resolution information, the operation of obtaining the first motion vector includes: determining a third vector transformation parameter according to the resolution information of the current frame to be encoded and the resolution information of the target reference frame; and obtaining first motion vectors corresponding to the code blocks in the current frame to be encoded according to the third vector transformation parameter.

In an example embodiment, the obtaining first motion vectors corresponding to the code blocks in the current frame to be encoded according to the third vector transformation parameter includes: obtaining first location information corresponding to a current code block, and obtaining second location information corresponding to a target reference block that corresponds to the current code block; and calculating a first motion vector corresponding to the current code block according to the third vector transformation parameter, the first location information and the second location information.

Optionally, the current code block is a code block that requires predictive encoding currently in the input video frame. The target reference block is an image block that is in the target reference frame and that is used for performing predictive encoding on the current code block. The first location information corresponding to the current code block may be represented by coordinates of pixels. The first location information corresponding to the current code block may include coordinates corresponding to all pixels of the current code block, or the first location information corresponding to the current code block may include coordinates of one or more pixels of the current code block. The first location information corresponding to the current code block may include coordinates corresponding to all pixels of the current code block, or the first location information corresponding to the current code block may include coordinates of one or more pixels of the current code block. The second location information corresponding to the target reference block may include coordinates corresponding to all pixels of the target reference block, or the second location information corresponding to the target reference block may include coordinates of one or more pixels of the target reference block. For example, coordinates of the first pixel point of a current image block may be used as a coordinate value of the current code block, and coordinates of the first image pixel point of the target reference block may be used as a coordinate value of the target reference block.

The encoder side may transform the first location information by using the third vector transformation parameter, to obtain corresponding first transformed location information, and obtain the first motion vector according to a difference between the first transformed location information and the second location information. Alternatively, the second location information may be transformed by using the third vector transformation parameter, to obtain corresponding second transformed location information, and the first motion vector is obtained according to a difference between the first location information and the second transformed location information.

In an example embodiment, the third vector transformation parameter is a ratio obtained by dividing larger resolution information between the resolution information of the current frame to be encoded and the resolution information of the target reference frame by smaller resolution information thereof, where a resolution corresponding to the larger resolution information is greater than a resolution corresponding to the smaller resolution information. The third vector transformation parameter is used for transforming location information of a frame with the smaller resolution information in the current frame to be encoded and the target reference frame. For example, the resolution of the current frame to be encoded is 1200×1200 pixels, and the resolution of the target reference frame is 600×600 pixels. In this case, the larger resolution is 1200×1200 pixels, and the smaller resolution is 600×600 pixels. The first vector transformation parameter may be 2. It is assumed that the first location information is (6, 8), and the second location information is (3, 3). In this case, the first motion vector is (6, 8)-(3×2, 3×2)=(0, 2). In this embodiment of the disclosure, by transforming the location information corresponding to the frame with the smaller resolution information, the value of the first motion vector may be reduced, thereby reducing the data amount of the encoded data.

In this embodiment of the disclosure, when the resolution corresponding to the unit of the first motion vector is the resolution corresponding to the input video frame, that is, the original resolution, for an input video frame sequence with a uniform resolution, units of target motion vectors corresponding to all input video frames are consistent, so that the continuity of the target motion vectors can be maintained. When the resolution corresponding to the unit of the target motion vector is the resolution corresponding to the current frame to be encoded, because the resolution information of the current frame to be encoded is consistent with the target motion vector unit resolution information, the first motion vector does not need to be transformed, thereby reducing a computing time.

In an example embodiment, the encoder side may add, to the encoded data, identification information representing the target motion vector unit resolution information, where the identification information is used for representing resolution information corresponding to the target motion vector. An adding position of the identification information in the encoded data may be one or more of group-level header information, sequence-level header information, frame-level header information, and block-level header information, where the block-level header information refers to header information of encoded data corresponding to a code block. The adding position of the identification information in the encoded data may be determined based on the target motion vector unit resolution information. For example, if resolutions corresponding to vector units in a video sequence are consistent, the adding position may be the sequence-level header information. Resolution information represented by a specific value of a flag may be set according to a requirement. For example, when the resolution corresponding to the target motion vector unit resolution information is the original resolution, the corresponding flag MV_Scale_Adaptive is 0; when the resolution corresponding to the target motion vector unit resolution information is the resolution corresponding to the current frame to be encoded, the corresponding flag MV_Scale_Adaptive is 1.

In an example embodiment, operation S510 of encoding the current frame to be encoded according to the target reference frame to obtain encoded data corresponding to the current frame to be encoded includes: obtaining an initial predicted motion vector corresponding to a current code block; obtaining a second vector transformation coefficient according to current motion vector unit resolution information corresponding to the initial predicted motion vector and the target motion vector unit resolution information; obtaining a target predicted motion vector corresponding to the current code block according to the initial predicted motion vector and the second vector transformation coefficient; and obtaining a motion vector difference according to the target motion vector and the target predicted motion vector.

Optionally, to reduce the quantity of bits used for encoded data, the encoder side may predict a motion vector of the current code block to obtain a predicted value, calculate a difference between the target motion vector and the predicted value to obtain a motion vector difference, and encode the motion vector difference. The initial predicted motion vector is used for predicting the motion vector of the current code block. There may be one or more initial predicted motion vectors, and this may be specifically set according to a requirement. An obtaining rule of the initial predicted motion vector may be set according to a requirement. Because the current code block is usually spatially correlated to an adjacent code block, a target motion vector value corresponding to one or more adjacent encoded blocks corresponding to the current code block may be used as the initial predicted motion vector. For example, a first motion vector value corresponding to adjacent encoded blocks at the upper right corner and upper left corner in the current code block may be used as the initial predicted motion vector. Alternatively, a motion vector value of the target reference block corresponding to the current code block may be used as the initial predicted motion vector.

Further, the current motion vector unit resolution information refers to information corresponding to a current resolution that corresponds to a unit of the initial predicted motion vector, and may be, for example, the current resolution or a downsampling ratio. The resolution corresponding to the unit of the initial predicted motion vector means that the unit of the initial predicted motion vector is calculated by using a vector unit under the current resolution as a standard, that is, the motion vector under the current resolution. When the current motion vector unit resolution information corresponding to the initial predicted motion vector is different from the target motion vector unit resolution information, the second vector transformation coefficient needs to be obtained according to the current motion vector unit resolution information corresponding to the initial predicted motion vector and the target motion vector unit resolution information. The second vector transformation coefficient is used for transforming the initial predicted motion vector into a motion vector under a target resolution. The second vector transformation coefficient may be a ratio between the resolution information corresponding to the unit of the target motion vector and the current motion vector unit resolution information. For example, it is assumed that the resolution corresponding to the unit of the target motion vector is 200×200 pixels, and the current motion vector unit resolution information is 100×100 pixels. In this case, the second vector transformation coefficient may be 2.

Further, after obtaining the second vector transformation coefficient, the encoder side performs calculation according to the initial predicted motion vector and the second vector transformation coefficient, to obtain a target predicted motion vector. The target predicted motion vector is a predicted motion vector under the target resolution. For example, when there is one initial predicted motion vector, a product between the initial predicted motion vector and the second vector transformation coefficient may be used as the target predicted motion vector. When there are a plurality of initial predicted motion vectors, calculation may be performed on the initial predicted motion vectors to obtain a calculation result, and the target motion vector is obtained according to the calculation result and the second vector transformation coefficient. The calculation result may be one or more of a minimum value, a mean value, and a median value of the initial predicted motion vectors. It would be appreciated that an algorithm for obtaining the target predicted motion vector according to the initial predicted motion vector and the second vector transformation coefficient may be customized, and a consistent customized algorithm may be used at the decoder side to obtain the same target predicted motion vector through calculation.

Further, a difference between the target motion vector and the target predicted motion vector is used as a motion vector difference, to perform encoding according to the motion vector difference to obtain encoded data, thereby reducing the data amount of the encoded data.

In this embodiment of the disclosure, the initial predicted motion vector is transformed to obtain the target predicted motion vector under the target resolution, so that units of the target predicted motion vector and the target motion vector are under quantization scales matching each other. Therefore, the obtained motion vector difference is small, thereby reducing the data amount of the encoded data.

According to the foregoing video encoding method, a sampling manner of a reference frame corresponding to a current frame to be encoded may be flexibly selected, and the reference frame is sampled according to the sampling manner to obtain a target reference frame. The current frame to be encoded is encoded according to the target reference frame, to reduce the data amount of to-be-encoded data. The sampling manner of the reference frame may be selected flexibly to perform sampling and reconstruction on the reference frame and adjust a resolution of the reference frame. Therefore, the reference frame, even if having a resolution different from that of the current current frame to be encoded, may still be used as a reference frame, thereby improving the use efficiency of the reference frame, improving the accuracy of inter-frame prediction, reducing a prediction residual, and improving the quality of an encoded image.

In an example embodiment, the operation of sampling the reference frame based on the sampling manner according to resolution information of the current frame to be encoded to obtain a corresponding target reference frame includes: determining, according to the resolution information of the current frame to be encoded and resolution information of the reference frame, a sampling ratio corresponding to the sampling of the reference frame; and sampling the reference frame according to the sampling manner and the sampling ratio, to obtain the corresponding target reference frame.

Optionally, the encoder side may obtain the resolution information of the current frame to be encoded and the resolution information of the reference frame. The sampling ratio corresponding to the sampling of the reference frame is determined according to the resolution information of the current frame to be encoded and the resolution information of the reference frame. The sampling ratio corresponding to the sampling of the reference frame needs to meet the following condition: a target reference frame is obtained after the reference frame is sampled, and a resolution of the target reference frame is consistent with that of the current frame to be encoded.

In an example embodiment, when a current frame to be encoded in a full-resolution manner is referenced to a reference frame processed in a downsampling manner, an upsampling ratio for upsampling and reconstruction of the reference frame may be a reciprocal of a downsampling ratio corresponding to the reference frame processed in the downsampling manner. An upsampling direction may be one of vertical upsampling, horizontal upsampling, and vertical and horizontal upsampling.

In an example embodiment, when a current frame to be encoded processed in a downsampling manner is referenced to a reference frame processed in a downsampling manner, and a downsampling ratio of the current frame to be encoded is greater than a downsampling ratio of the reference frame, an upsampling ratio for upsampling and reconstruction of the reference frame needs to meet a condition that a resolution of a target reference frame obtained after the upsampling and reconstruction is consistent with a resolution of the current frame to be encoded. For example, a resolution of a video frame in a full-resolution manner is 12M×12N, a resolution of a current frame to be encoded processed in a 1/2 downsampling manner is 6M×6N, and a resolution of a reference frame processed in a 1/6 downsampling manner is 2M×2N. In this case, 3× upsampling may be performed on the reference frame to obtain a target reference frame, where the target reference frame has a resolution of 6M×6N.

In an example embodiment, when a current frame to be encoded processed in a downsampling manner is referenced to a reference frame in a full-resolution manner, a downsampling ratio for downsampling and reconstruction of the reference frame may be a downsampling ratio corresponding to the current frame to be encoded processed in the downsampling manner. A downsampling direction may be one of vertical downsampling, horizontal downsampling, and vertical and horizontal downsampling.

In an example embodiment, when a current frame to be encoded processed in a downsampling manner is referenced to a reference frame processed in a downsampling manner, and a downsampling ratio of the current frame to be encoded is less than a downsampling ratio of the reference frame, a downsampling ratio for downsampling and reconstruction of the reference frame needs to meet a condition that a resolution of a target reference frame obtained after the downsampling and reconstruction is consistent with a resolution of the current frame to be encoded. For example, a resolution of a video frame in a full-resolution manner is 12M×12N, a resolution of a current frame to be encoded processed in a 1/6 downsampling manner is 2M×2N, and a resolution of a reference frame processed in a 1/2 downsampling manner is 6M×6N. In this case, 1/3 downsampling may be performed on the reference frame to obtain a target reference frame, where the target reference frame has a resolution of 2M×2N.

In an example embodiment, the encoder side may further add, to the encoded data corresponding to the input video frame, sampling ratio information corresponding to the sampling ratio. During decoding, the decoder side may read the corresponding sampling ratio information in the encoded data, to determine the sampling ratio for sampling the reference frame.

Optionally, the sampling ratio information is used for describing a sampling ratio for sampling the reference frame, and a flag Sampling Scale for describing the sampling ratio information may be added to the encoded data. A specific value of the flag may be set according to a requirement. An adding position of the sampling ratio information in the encoded data may be any one of frame-level header information, group-level header information, or sequence-level header information. The adding position of the sampling ratio information in the encoded data may be determined based on the sampling. The sampling ratio information may be determined according to the resolution information of the current frame to be encoded and the resolution information of the reference frame.

In the foregoing embodiment, the sampling ratio corresponding to the sampling of the reference frame is determined according to the resolution information of the current frame to be encoded and the resolution information of the reference frame, and then the reference frame is sampled according to the determined sampling ratio, so that an appropriate target reference frame can be obtained, for example, a target reference frame having a resolution consistent with that of the current frame to be encoded, thereby facilitating subsequent video encoding.

In an example embodiment, the operation of sampling the reference frame based on the sampling manner according to resolution information of the current frame to be encoded to obtain a corresponding target reference frame includes: sampling the reference frame based on the sampling manner according to the resolution information of the current frame to be encoded, to obtain an intermediate reference frame; and performing sub-pixel interpolation processing on the intermediate reference frame to obtain the target reference frame.

Sub-pixel interpolation is a process of obtaining sub-pixel-level reference data through interpolation by using integer-pixel reference data in the intermediate reference frame. For example, FIG. 7(1) and FIG. 7(2) are schematic diagrams of interpolation on a reference frame according to an example embodiment. Referring to FIG. 7(1), pixel points such as A1, A2, A3, B1, B2, and B3 are 2×2 integer pixel points in the reference frame. Reference data of sub-pixel points is calculated according to reference data of the integer pixel points. For example, reference data of a sub-pixel point a23 may be calculated according to an average value of the reference data of the three integer pixel points A1, A2, and A3; reference data of a sub-pixel point a21 is calculated according to an average value of the reference data of the three integer pixel points A2, B2, and C2; and then reference data of a sub-pixel point a22 is calculated according to the reference data of the sub-pixel points a23 and a21, thereby implementing interpolation with 1/2 pixel precision on the reference frame. Referring to FIG. 7(2), pixel points such as A1, A2, A3, B1, B2, and B3 are 4×4 integer pixel points in the reference frame. Reference data of 15 sub-pixel points is calculated according to reference data of the integer pixel points, thereby implementing interpolation with 1/4 pixel precision on the reference frame. For example, reference data of a sub-pixel point a8 is calculated according to the reference data of the integer pixel points A2 and B2; reference data of a sub-pixel point a2 is calculated according to the reference data of the integer pixel points A2 and A3; in this manner, reference data of 15 sub-pixel points: a1 to a15, is calculated, thereby implementing interpolation with 1/4 pixel precision on the reference frame. In the process of encoding the current frame to be encoded, a reference block corresponding to a code block in the current frame to be encoded needs to be determined in the reference frame by using a motion search technology. A motion vector is obtained through calculation according to motion information of the code block relative to the reference block. The motion vector is encoded to inform the decoder side of a location of reference data corresponding to the reference block in the reference frame. Therefore, sub-pixel interpolation processing is performed on the reference frame to obtain a target reference frame, so that motion estimation may be performed on the current frame to be encoded according to the target reference frame with a higher resolution, thereby improving the accuracy of motion estimation and improving the encoding quality.

In an example embodiment, the reference frame is sampled based on the determined sampling manner according to the resolution information of the current frame to be encoded, to obtain an intermediate reference frame, and the intermediate reference frame may be directly used as the target reference frame.

In an example embodiment, the encoder side may sample the reference frame based on the determined sampling manner according to the resolution information of the current frame to be encoded, to obtain an intermediate reference frame. Sub-pixel interpolation processing is performed on the intermediate reference frame, to obtain the target reference frame.

In an example embodiment, the encoder side may specify, in the respective encoding/decoding rule, a sub-pixel interpolation manner used for processing according to the intermediate reference frame to obtain the target reference frame. During encoding/decoding, the sub-pixel interpolation manner corresponding to processing of the intermediate reference frame is determined according to the configuration. Sub-pixel interpolation manners used by the encoder side and the decoder side need to be consistent with each other.

In an example embodiment, when the input video frame is encoded by using an adaptive-resolution encoding framework, sub-pixel interpolation manner information corresponding to the sub-pixel interpolation manner may be added to the encoded data corresponding to the input video frame. An adding position of the sub-pixel interpolation manner information in the encoded data may be any one of corresponding sequence-level header information, group-level header information, and frame-level header information. The adding position of the sub-pixel interpolation manner information in the encoded data may be determined based on the sub-pixel interpolation manner. The sub-pixel interpolation manner information may be added to the frame-level header information of the encoded data corresponding to the input video frame, indicating that when the input video frame is encoded, sub-pixel interpolation processing is performed on the corresponding reference frame by using the sub-pixel interpolation manner corresponding to the sub-pixel interpolation manner information. For example, when a flag Pixel_Sourse_Interpolation used for determining the sub-pixel interpolation manner in the frame-level header information of the encoded data is 0, it indicates that sub-pixel interpolation processing is directly performed on the reference frame corresponding to the input video frame; when Pixel_Sourse_Interpolation is 1, it indicates that the reference frame corresponding to the input video frame is sampled, and then sub-pixel interpolation processing is performed. The decoder side may perform sub-pixel interpolation processing on the reference frame according to the sub-pixel interpolation manner indicated by the flag in the encoded data to obtain the target reference frame, so that a reconstructed video frame may be obtained by decoding the encoded data according to the target reference frame.

In the foregoing embodiment, the reference frame is sampled to obtain an intermediate reference frame, and then sub-pixel interpolation processing is performed on the intermediate reference frame to obtain the target reference frame. Sub-pixel interpolation processing is performed on the intermediate reference frame, to further improve a degree of image matching between the current frame to be encoded and a frame to be referenced to, thereby greatly improving the pixel precision of motion estimation, reducing a prediction residual, and improving the quality of an encoded image.

In an example embodiment, the operation of sampling the reference frame based on the sampling manner according to resolution information of the current frame to be encoded to obtain a corresponding target reference frame includes: sampling the reference frame based on the sampling manner according to the resolution information of the current frame to be encoded and motion estimation pixel precision, to obtain the corresponding target reference frame.

The motion estimation pixel precision is a unit length of a motion vector corresponding to each code block in the current frame to be encoded. When encoding the code block in the current frame to be encoded, the encoder side may refine the unit length of the motion vector corresponding to the code block according to the obtained motion estimation pixel precision, so that the obtained motion vector is more refined and accurate. Therefore, the reference frame needs to be sampled according to the obtained motion estimation pixel precision to obtain the target reference frame. Then, a first motion vector corresponding to each code block in the current frame to be encoded is calculated according to the target reference frame, and encoding is performed based on the first motion vector to obtain the encoded data corresponding to the current frame to be encoded.

Optionally, the resolution information of the reference frame may be obtained. A sampling method for the reference frame, a sampling ratio corresponding to the sampling, and pixel interpolation precision are determined according to the sub-pixel interpolation manner used by the current frame to be encoded, the resolution information of the current frame to be encoded, the resolution information of the reference frame, and the motion estimation pixel precision corresponding to the current frame to be encoded. The value of the motion estimation pixel precision may be set according to a requirement, and generally is, for example, 1/2 pixel precision, 1/4 pixel precision, or 1/8 pixel precision.

In an example embodiment, the encoder side may configure corresponding motion estimation pixel precision for the current frame to be encoded according to image feature information of the current frame to be encoded. The image feature information is, for example, a size of the current frame to be encoded, texture information, and a motion speed. The motion estimation pixel precision corresponding to the current frame to be encoded may be determined according to a combination of various image feature information. A current frame to be encoded carrying image data with higher complexity and richer image information corresponds to higher motion estimation pixel precision. For example, when inter-frame prediction is performed on a P frame, a motion vector corresponding to each code block in the P frame may be calculated by using higher motion estimation pixel precision; when inter-frame prediction is performed on a B frame, a motion vector corresponding to each code block in the B frame may be calculated by using lower motion estimation pixel precision.

In an example embodiment, the operation of sampling the reference frame according to the resolution information of the current frame to be encoded and motion estimation pixel precision to obtain the corresponding target reference frame includes: calculating pixel interpolation precision according to the resolution information of the current frame to be encoded and the motion estimation pixel precision; and directly performing sub-pixel interpolation processing on the reference frame according to the pixel interpolation precision, to obtain the corresponding target reference frame.

Optionally, the pixel interpolation precision is pixel precision corresponding to sub-pixel interpolation performed on the reference frame. When the sub-pixel interpolation manner is a direct sub-pixel interpolation manner, it indicates that sub-pixel interpolation processing may be directly performed on the reference frame to obtain the target reference frame. Therefore, the pixel interpolation precision may be calculated according to the resolution information of the current frame to be encoded and the motion estimation pixel precision. A ratio between the resolution information of the reference frame and the resolution information of the current frame to be encoded may be calculated, and the pixel interpolation precision is obtained according to the ratio and the motion estimation pixel precision.

In an example embodiment, when the resolution of the reference frame is greater than the resolution of the current frame to be encoded, data of some sub-pixel points in the reference frame may be directly reused as data corresponding to sub-pixel points corresponding to the motion estimation pixel precision. That is, when the resolution of the reference frame is greater than the resolution of the current frame to be encoded, it is possible to directly perform sub-pixel interpolation processing on the reference frame without downsampling. For example, the resolution of the current frame to be encoded is M×N, and the resolution of the reference frame is 2M×2N. If the motion estimation pixel precision is 1/2 and the pixel interpolation precision is 1, the reference frame may be directly used as the target reference frame; if the motion estimation pixel precision is 1/4, it is obtained through calculation that the pixel interpolation precision is 1/2, and sub-pixel interpolation processing with the 1/2 pixel interpolation precision may be performed on the reference frame to obtain the target reference frame.

In an example embodiment, in a case that the resolution indicated by the resolution information of the current frame to be encoded is the same as the resolution of the reference frame, the encoder side directly performs sub-pixel interpolation processing on the reference frame according to the motion estimation pixel precision, to obtain the corresponding target reference frame.

Optionally, when the input video frame is processed in a full-resolution processing manner to obtain the current frame to be encoded and the resolution of the reference frame is also the original resolution, the resolution of the current frame to be encoded is the same as the resolution of the reference frame. Optionally, when the input video frame is processed in a downsampling manner to obtain the current frame to be encoded and the reference frame is also reconstructed based on encoded data that is obtained through encoding in a downsampling manner with the same sampling ratio, the resolution of the current frame to be encoded is the same as the resolution of the reference frame. In this case, sub-pixel interpolation processing may be directly performed on the reference frame based on the motion estimation pixel precision to obtain the target reference frame, and the pixel interpolation precision corresponding to the sub-pixel interpolation processing is the same as the motion estimation pixel precision.

In an example embodiment, in a case that the resolution indicated by the resolution information of the current frame to be encoded is less than the resolution of the reference frame, the reference frame is downsampled according to the resolution information of the current frame to be encoded to obtain an intermediate reference frame, and then sub-pixel interpolation processing is performed on the intermediate reference frame based on the motion estimation pixel precision corresponding to the current frame to be encoded, to obtain the corresponding target reference frame. For example, an input video frame having a resolution of 2M×2N is downsampled according to a downsampling processing manner to obtain a current frame to be encoded having a resolution of M×N, and a resolution of a reference frame is 2M×2N (in a full-resolution processing manner). In this case, the reference frame is downsampled according to a sampling ratio of 1/2 to obtain an intermediate reference frame having a resolution of M×N. If motion estimation pixel precision corresponding to the obtained current frame to be encoded is 1/2, sub-pixel interpolation processing is then performed on the intermediate reference frame according to pixel interpolation precision that is the same as the motion estimation pixel precision, that is, 1/2 sub-pixel interpolation precision, to obtain a target reference frame. If motion estimation pixel precision corresponding to the obtained current frame to be encoded is 1/4, sub-pixel interpolation processing is performed on the intermediate reference frame according to 1/4 sub-pixel interpolation precision, to obtain a target reference frame.

In an example embodiment, in a case that the resolution indicated by the resolution information of the current frame to be encoded is greater than the resolution of the reference frame, the reference frame is upsampled according to the resolution information of the current frame to be encoded to obtain an intermediate reference frame, and then sub-pixel interpolation processing is performed on the intermediate reference frame based on the motion estimation pixel precision corresponding to the current frame to be encoded, to obtain the corresponding target reference frame. For example, if the resolution of the current frame to be encoded is 2M×2N and the resolution of the reference frame is 1/2 M×1/2 N, the reference frame needs to be upsampled according to a sampling ratio of 4, to obtain an intermediate reference frame having the same resolution as the current frame to be encoded. If the motion estimation pixel precision is 1/2, sub-pixel interpolation processing is performed on the obtained intermediate reference frame according to 1/2 pixel interpolation precision, to obtain the target reference frame; if the motion estimation pixel precision is 1/4, sub-pixel interpolation processing is performed on the obtained intermediate reference frame according to 1/4 pixel interpolation precision, to obtain the target reference frame.

In an example embodiment, after obtaining the reference frame, the encoder side may determine a sub-pixel interpolation manner for performing sub-pixel interpolation processing on the reference frame, and then process, by using the sub-pixel interpolation manner, the reference frame according to the resolution information of the current frame to be encoded, to obtain the corresponding target reference frame. Sub-pixel interpolation includes directly performing sub-pixel interpolation processing on the reference frame and performing sub-pixel interpolation processing on the reference frame after sampling.

Optionally, when the reference frame and the current frame to be encoded have the same resolution, sub-pixel interpolation processing may be directly performed on the reference frame. When the reference frame and the current frame to be encoded have different resolutions, sub-pixel interpolation processing may be directly performed on the reference frame, or the reference frame may be sampled first to obtain a frame having the same resolution as the current frame to be encoded and then sub-pixel interpolation processing is performed on the frame having the same resolution, where two sub-pixel interpolation manners are applicable. The sampling of the reference frame includes upsampling and downsampling. In an example embodiment, if there are a plurality of reference frames, each reference frame is sampled respectively to obtain a frame having the same resolution as the current frame to be encoded.

In an example embodiment, in the manner of sampling the reference frame and then performing sub-pixel interpolation processing, a sampling manner corresponding to the current frame to be encoded may be determined, and the reference frame is sampled based on the sampling manner according to the resolution information of the current frame to be encoded, to obtain an intermediate reference frame. Sub-pixel interpolation processing is performed on the intermediate reference frame, to obtain the target reference frame. In this embodiment, the reference frame is sampled to obtain a frame having the same resolution as the current frame to be encoded, so that a degree of image matching between the current frame to be encoded and frame to be referenced to may be improved to some extent, thereby improving the accuracy of inter-frame prediction, reducing a prediction residual, and improving the quality of an encoded image.

In an example embodiment, the encoder side and the decoder side may specify, in the respective encoding/decoding rules, sub-pixel interpolation manners to be used for performing processing according to the reference frame to obtain the target reference frame. The used sub-pixel interpolation manners need to be consistent, and the corresponding sub-pixel interpolation manner for processing the reference frame is determined according to the configuration during encoding/decoding.

In an example embodiment, when the input video frame is encoded by using an adaptive-resolution encoding framework, the encoder side may further add, to the encoded data corresponding to the current frame to be encoded, sub-pixel interpolation manner information corresponding to the sub-pixel interpolation manner. An adding position of the sub-pixel interpolation manner information in the encoded data may be any one of corresponding sequence-level header information, group-level header information, and frame-level header information. The adding position of the sub-pixel interpolation manner information in the encoded data may be determined based on the sub-pixel interpolation manner. The sub-pixel interpolation manner information may be added to the frame-level header information of the encoded data corresponding to the input video frame, indicating that when the input video frame is encoded, sub-pixel interpolation processing is performed on the corresponding reference frame by using the sub-pixel interpolation manner corresponding to the sub-pixel interpolation manner information. For example, when a flag Pixel_Sourse_Interpolation used for determining the sub-pixel interpolation manner in the frame-level header information of the encoded data is 0, it indicates that sub-pixel interpolation processing is directly performed on the reference frame corresponding to the input video frame; when Pixel_Sourse_Interpolation is 1, it indicates that the reference frame corresponding to the input video frame is sampled, and then sub-pixel interpolation processing is performed. The decoder side may perform sub-pixel interpolation processing on the reference frame according to the sub-pixel interpolation manner indicated by the flag in the encoded data to obtain the target reference frame, so that a reconstructed video frame may be obtained by decoding the encoded data according to the target reference frame.

Figure 8:
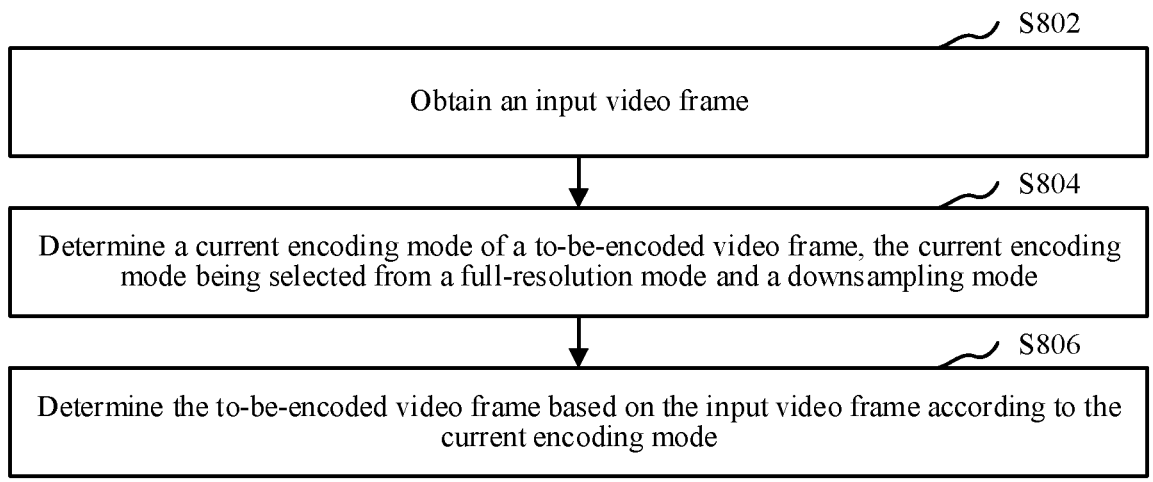
FIG. 8 is a schematic flowchart of operations of determining a current frame to be encoded according to an example embodiment.

FIG. 8 is a schematic flowchart of operations of determining a current frame to be encoded according to an example embodiment. Referring to FIG. 8, the determining a current frame to be encoded includes the following operations S802-S806.

S802. Obtain an input video frame.

Optionally, a video frame is a basic unit forming a video, and one video sequence may include a plurality of video frames. The input video frame may be a video frame acquired in real time, for example, a video frame obtained in real time through a camera of a terminal, or may be a video frame corresponding to a video stored in advance. An encoded frame prediction type corresponding to the input video frame may be determined according to an encoding algorithm. The encoded frame prediction type may include an I frame, a P frame, or a B frame, where the I frame is an intra-predicted frame, the P frame is a forward predicted frame, and the B frame is a bi-directional predicted frame.

S804. Determine a current encoding mode of the current frame to be encoded, the current encoding mode being selected from a full-resolution mode and a downsampling mode.

Optionally, the current frame to be encoded may be a video frame acquired in real time for instant messaging, or may be a video frame corresponding to a stored video. The current encoding mode is a processing manner for processing the input video frame. The processing manner corresponding to the input video frame is selected from candidate processing manners. The candidate processing manners may be a full-resolution processing manner and a downsampling processing manner. A method for obtaining the processing manner corresponding to the input video frame may be set according to an actual requirement. For example, a processing parameter corresponding to the input video frame may be obtained, and the corresponding processing manner is obtained according to the processing parameter. The processing parameter is a parameter for determining a processing manner, and a processing manner to be used may be set as appropriate. For example, the processing parameter may include at least one of current encoding information and an image feature corresponding to the input video frame.

In an example embodiment, when the processing manner corresponding to the input video frame includes a downsampling processing manner, a downsampling ratio and a downsampling method may further be obtained. In an example embodiment, the downsampling ratio may be obtained according to a processor capacity of a device, such as a terminal or a server, performing the video encoding method. A device with a high processor processing capacity corresponds to a large downsampling ratio, and a device with a low processor processing capacity corresponds to a small downsampling ratio. A correspondence between processor processing capacities and downsampling ratios may be set. When encoding is to be performed, a processor processing capacity is obtained, and a corresponding downsampling ratio is obtained according to the processor processing capacity. For example, it may be specified that a downsampling ratio corresponding to a 16-bit processor is 1/8, and a downsampling ratio corresponding to a 32-bit processor is 1/4.

In an example embodiment, the downsampling ratio may be obtained according to the frequency or the number of times of the input video frame being used as a reference frame, and a correspondence between the downsampling ratio and the frequency or the number of times of the input video frame being used as a reference frame may be set. A higher frequency or a larger number of times of the input video frame being used as a reference frame corresponds to a larger downsampling ratio. A lower frequency or a smaller number of times of the input video frame being used as a reference frame corresponds to a smaller downsampling ratio. For example, the frequency of an I frame being used as a reference frame is high, and therefore the corresponding downsampling ratio is large, which may be 1/2. The frequency of a P frame being used as a reference frame is low, and therefore the corresponding downsampling ratio is small, which may be, for example, 1/4. The downsampling ratio is obtained according to the frequency or the number of times of the input video frame being used as a reference frame, and when the input video frame is used as a reference frame frequently or for a large number of times, the image quality is relatively good. Therefore, the accuracy of prediction can be improved, thereby reducing a prediction residual and improving the quality of an encoded image.

In an example embodiment, the downsampling method may be obtained according to a processor capacity of a device, such as a terminal or a server, performing the video encoding method. A device with a high processor processing capacity corresponds to a high-complexity downsampling method, and a device with a low processor processing capacity corresponds to a low-complexity downsampling method. A correspondence between processor processing capacities and downsampling methods may be set. When encoding needs to be performed, a processor processing capacity is obtained, and a corresponding downsampling method is obtained according to the processor processing capacity.

In this embodiment of the disclosure, when the input video frame is processed in a downsampling processing manner, downsampling may be performed according to different downsampling methods or downsampling ratios, and the processing manner for the input video frame becomes more flexible.

In an example embodiment, the encoder side may determine a current encoding mode according to current encoding information and/or image feature information of the current frame to be encoded, and optional encoding modes include a full-resolution mode and a downsampling mode.

Optionally, the current encoding information of the current frame to be encoded refers to video compression parameter information of the video during encoding, for example, a frame prediction type, a motion vector, a quantization parameter, a video source, a bit rate, a frame rate, and a resolution. The frame prediction type includes intra-frame prediction, such as an I frame, forward inter-frame prediction, such as a P frame, and bi-directional inter-frame prediction, such as a B frame. The current encoding mode corresponding to the current frame to be encoded is determined according to the current encoding information and/or the image feature information, and may be a full sampling mode or a downsampling mode.

In an example embodiment, the current encoding information and/or the image feature information reflect a scenario, detail complexity, motion intensity, and the like that correspond to a video frame. For example, a motion scenario may be determined by using a motion vector, a quantization parameter, and a bit rate. A large quantization parameter may indicate high motion intensity, and a large motion vector indicates that an image scenario is a large motion scenario. The motion scenario may alternatively be performed according to a ratio of a bit rate of an encoded I frame to that of an encoded P frame or a ratio of a bit rate of an encoded I frame to that of an encoded B frame. If the ratio exceeds a first preset threshold, it is determined that an image is a still image; if the ratio is less than a second preset threshold, it may be determined that an image is an image with high motion intensity. Alternatively, a target object is directly tracked according to image content, and whether a scenario is a large motion scenario is determined according to a motion speed of the target object. At a fixed bit rate, a fixed amount of information may be expressed. For a scenario with high motion intensity, the amount of time-domain information is large, and accordingly, a bit rate that can be used for expressing space-domain information is small. Therefore, a relatively good image quality effect may be achieved by using a low resolution, and it is more inclined to select a downsampling mode for encoding.

In an example embodiment, an image switching scenario may be determined according to the frame prediction type, and a preferred encoding mode may be determined according to influence of the frame prediction type on other frames. For example, an I frame is usually the first frame or exists in image switching, and quality of the I frame affects quality of a subsequent P frame or B frame. Therefore, it is more inclined to select full-resolution encoding for an intra-predicted frame than for an inter-predicted frame, to ensure image quality. The P frame may be used as a reference frame of the B frame, and image quality of the P frame affects image quality of the subsequent B frame. Therefore, it is more inclined to select full-resolution encoding if the P frame is used for encoding, compared with a case of using the B frame for encoding.

In an example embodiment, the encoder side may determine texture complexity of the current frame to be encoded according to the image feature information, for example, image texture information. If the texture is complex and includes a large quantity of details, the image has a large amount of space-domain information. If downsampling is performed, a relatively large amount of detail information may be lost due to the downsampling, and video quality is affected. Therefore, it is more inclined to select full-resolution encoding for a current frame to be encoded having a complex texture than for a current frame to be encoded having a simple texture.

In an example embodiment, according to the foregoing encoding mode selection rules, the current encoding mode may be determined according to one or more of the current encoding information and/or the image feature information. When various information is considered, the various information may be comprehensively weighted, and in combination with encoding mode selection rules corresponding to the information, the final current encoding mode is determined.

In an example embodiment, the encoder side may obtain a frame prediction type of the current frame to be encoded, obtain a quantization parameter threshold corresponding to the frame prediction type, determine that the current encoding mode is the downsampling mode if the current quantization parameter is greater than the quantization parameter threshold, and otherwise, determine that the current encoding mode is the full-resolution mode.

Optionally, according to an encoding mode determining rule, it is usually more inclined to select full-resolution encoding for an intra-predicted frame than for an inter-predicted frame. It is more inclined to select full-resolution encoding for encoding of a P frame than for encoding of a B frame. Therefore, a quantization parameter threshold of the I frame is set to be greater than or equal to that of the P frame, and the quantization parameter threshold of the P frame is greater than or equal to that of the B frame. It is determined that the current encoding mode is the downsampling mode only when the current quantization parameter is greater than the quantization parameter threshold; otherwise, it is determined that the current encoding mode is the full-resolution mode. A large current quantization parameter usually indicates higher motion intensity, and the downsampling mode is more inclined to be selected for encoding in a scenario having higher motion intensity.

In an example embodiment, a proportion of intra-frame prediction blocks is in a positive correlation with the quantization parameter threshold. For example, it may be determined in advance according to experience that a correspondence between the proportion $Intra_0$ of intra-frame prediction blocks and the quantization parameter threshold $QP_{TH}$ is as follows:

$$QP_{TH} = \begin{cases} 33, & Intra_0 < 10\% \\ 31, & 10\% \leq Intra_0 < 50\% \\ 29, & Intra_0 \geq 50\% \end{cases}$$

S806. Determine the current frame to be encoded based on the input video frame and according to the current encoding mode.

Optionally, the encoder side may process the input video frame according to the current encoding mode to obtain the current current frame to be encoded. The current frame to be encoded is downsampled when the current encoding mode is the downsampling mode, to obtain the current frame to be encoded; when the current encoding mode is the full sampling mode, the input video frame is determined as the current frame to be encoded. For example, when a resolution of the input video frame is 800×800 pixels and the current encoding mode is 1/2 downsampling in both a horizontal direction and a vertical direction, a resolution of the current frame to be encoded obtained after downsampling is 400× 400 pixels.

In an example embodiment, the encoder side may add, to the encoded data corresponding to the input video frame, processing manner information corresponding to the current encoding mode.

Optionally, the processing manner information is used for describing a processing manner used for the input video frame, that is, the current encoding mode of the current frame to be encoded. The encoder side may add, to the encoded data, a flag Frame_Resolution_Flag for describing the processing manner. A value of the flag corresponding to each processing manner may be set according to a requirement. For example, when the processing manner is a full-resolution processing manner, the corresponding Frame_Resolution_Flag may be 0, and when the processing manner is a downsampling processing manner, the corresponding Frame_Resolution_Flag may be 1. In an example embodiment, the processing manner information may be added to frame-level header information, sequence-level header information, or group-level header information corresponding to the encoded data.

In an example embodiment, downsampling encoding manner information for downsampling the input video frame may further be added to the encoded data corresponding to the input video frame, so that when obtaining the encoded data, the decoder side may obtain, according to the downsampling encoding manner information, an upsampling method and an upsampling ratio for the reconstructed video frame. The downsampling encoding manner information includes at least one of downsampling method information and downsampling ratio information. An adding position of the downsampling method information in the encoded data may be one of the corresponding group-level header information, sequence-level header information, and frame-level header information. The adding position of the downsampling method information in the encoded data may be determined based on the downsampling method. An adding position of the downsampling ratio information in the encoded data may be any one of the corresponding group-level header information, sequence-level header information, and frame-level header information. The adding position of the downsampling ratio information in the encoded data may be determined according to an action range (or an application range) corresponding to the downsampling ratio, where the action range refers to a range of application. For example, if the action range (or application range) of the downsampling ratio is a GOP, the downsampling ratio information corresponding to the GOP may be added to header information corresponding to the GOP. If the action range (or application range) of the downsampling ratio is a video sequence, the downsampling ratio information is added to sequence-level header information corresponding to the video sequence, indicating that each video frame of the video sequence is downsampled by using the downsampling ratio corresponding to the downsampling ratio information.

In an example embodiment, the obtaining the processing manner corresponding to the input video frame includes: obtaining a processing parameter corresponding to the input video frame, and determining the processing manner corresponding to the input video frame according to the processing parameter. The adding, to the encoded data corresponding to the input video frame, processing manner information corresponding to the processing manner includes: when the processing parameter cannot be reproduced in a decoding process, adding, to the encoded data corresponding to the input video frame, the processing manner information corresponding to the processing manner.

Optionally, the processing parameter may include at least one of image encoding information and image feature information corresponding to the input video frame. That the processing parameter cannot be reproduced in decoding process means that the processing parameter cannot be obtained or is not produced in the decoding process. For example, if the processing parameter is information corresponding to image content of the input video frame and there is a loss of image information in the encoding process, a decoded video frame at the decoder side is different from the input video frame. Therefore, the information corresponding to the image content of the input video frame is not obtained in the decoding process, that is, the information corresponding to the image content cannot be reproduced in the decoding process. A rate-distortion cost needs to be calculated in the encoding process, while the rate-distortion cost is not calculated in the decoding process. Therefore, when the processing parameter includes the rate-distortion cost, the processing parameter cannot be reproduced in the decoding process. Peak signal to noise ratio (PSNR) information of the reconstructed video frame obtained in the encoding process and the input video frame cannot be obtained in the decoding process. Therefore, the PSNR information cannot be reproduced in the decoding process.

In an example embodiment, when the processing parameter can be reproduced in the decoder side, the processing manner information corresponding to the processing manner may be added to the encoded data corresponding to the input video frame, or the processing manner information corresponding to the processing manner may not be added to the encoded data corresponding to the input video frame. When the processing manner information corresponding to the processing manner is added to the encoded data corresponding to the input video frame, the decoder side may read the processing manner information from the encoded data, and does not need to obtain the processing manner according to processing data. When the processing manner information corresponding to the processing manner is not added to the encoded data corresponding to the input video frame, the decoder side determines the processing manner according to the processing parameter, thereby reducing the data amount of the encoded data.

In the foregoing embodiment, the current encoding mode of the current frame to be encoded may be determined adaptively, so that appropriate resolutions may be selected adaptively for encoding for different scenarios. Space-domain information is adaptively reduced through downsampling encoding, so that video quality under a limited bandwidth condition may be improved in different scenarios.

In an example embodiment, the operation of determining a current encoding mode of the current frame to be encoded includes: calculating a proportion of code blocks of a target prediction type in a forward encoded video frame corresponding to the input video frame; and determining the processing manner corresponding to the input video frame according to the proportion. The processing manner corresponding to the input video frame is the current encoding mode of the current current frame to be encoded.

Optionally, code blocks of the prediction type are code blocks corresponding to a frame prediction type. A proportion of a target prediction type may be one or both of a proportion corresponding to intra-blocks and a proportion corresponding to inter-blocks. The proportion of the code blocks of the target prediction type in the forward encoded video frame corresponding to the input video frame may be a ratio of the code blocks of the target prediction type to code blocks of other prediction types, or a ratio of the code blocks of the type to a total quantity of code blocks. This may be specifically set according to a requirement. For example, a first quantity of intra-blocks in the forward encoded video frame, and a second quantity of inter-blocks in the forward encoded video frame may be obtained. A ratio between the intra-blocks and the inter-blocks is calculated according to the first quantity and the second quantity. Alternatively, all code blocks in the forward encoded video frame are counted to obtain a third quantity, and a ratio between the quantity of the intra-blocks and the third quantity is calculated according to the first quantity and the third quantity. A ratio between the quantity of the inter-blocks and the third quantity may also be calculated according to the second quantity and the third quantity.

The forward encoded video frame refers to a video frame that has been encoded before the input video frame is encoded. A specific quantity of obtained forward encoded video frame may be customized. For example, the forward encoded video frame may be one encoded video frame prior to the input video frame, or the forward encoded video frame may be three encoded video frames prior to the input video frame. After the proportion corresponding to the code blocks of the target prediction type in the forward encoded video frame is obtained, the processing manner corresponding to the input video frame is determined according to the proportion obtained through calculation. If a plurality of forward encoded video frames are obtained, proportions corresponding to code blocks of different types in each forward encoded video frame may be calculated. A total proportion is obtained through weighted calculation according to the proportions. Then, a target processing manner corresponding to the input video frame is determined according to the total proportion and a preset threshold. A weight corresponding to the forward video frame may be in a negative correlation with an encoding distance between the forward encoded video frame and the input video frame.

In an example embodiment, the encoder side may calculate a proportion of intra-blocks in the forward encoded video frame to the forward encoded video frame, and when the proportion is greater than a target threshold, it is determined that the processing manner is the downsampling processing manner.

When the proportion corresponding to the intra-blocks is greater than the target threshold, it is determined that the target processing manner corresponding to the input video frame is the downsampling processing manner; otherwise, it is determined that the target processing manner corresponding to the video frame is the full-resolution processing manner. For example, when the proportion is greater than the target threshold, it is determined that the processing manner corresponding to the input video frame is the downsampling processing manner; otherwise, it is determined that the target processing manner corresponding to the video frame is the full-resolution processing manner.

In this embodiment of the disclosure, if the proportion of the intra-blocks is large, it indicates that the video is relatively complex or a correlation between video frames is relatively low, and therefore an obtained prediction residual is relatively large. Therefore, it is more inclined to select the downsampling processing manner for encoding, to reduce the amount of the encoded data.

The target threshold may be determined according to a processing manner of a reference frame corresponding to the input video frame. When the processing manner of the reference frame corresponding to the input video frame is a downsampling manner, a first preset threshold T1 is obtained, and the first preset threshold T1 is used as the target threshold. Similarly, when the processing manner of the reference frame corresponding to the input video frame is a full-resolution processing manner, a second preset threshold T2 is obtained, and the second preset threshold T2 is used as the target threshold. Further, after the target threshold is obtained according to resolution information of the reference frame corresponding to the input video frame, the processing manner of the input video frame is determined according to the target threshold and the proportion of the intra-blocks in the forward encoded video frame to the forward encoded video frame. When the proportion of intra-blocks in the forward encoded video frame to the forward encoded video frame is greater than the target threshold, it is determined that the processing manner corresponding to the input video frame is the downsampling processing manner.

In an example embodiment, the second preset threshold value is greater than the first preset threshold value. In this way, when the processing manner corresponding to the reference frame is the full-resolution processing manner, it is more inclined to use the full-resolution processing manner for the input video frame; when the processing manner corresponding to the reference frame is the downsampling processing manner, it is more inclined to use the downsampling processing manner for the input video frame.

In an example embodiment, before the input video frame is obtained, the video encoding method further includes: obtaining an input video sequence corresponding to the input video frame, and obtaining a target video sequence encoding mode corresponding to the input video sequence, where the target video sequence encoding mode includes a constant-resolution encoding mode or a mixed-resolution encoding mode; determining whether the target video sequence encoding mode is the mixed-resolution encoding mode; if yes, performing operation S502; otherwise, performing an operation of encoding each input video frame of the input video sequence at a constant resolution. When the video sequence encoding mode is the constant-resolution encoding mode, each input video frame of the input video sequence is encoded at a constant resolution.

The input video sequence may include a plurality of input video frames. When the target video sequence encoding mode is the constant-resolution encoding mode, each input video frame of the input video sequence is encoded at the same resolution, for example, full resolution. When the target video sequence encoding mode is the mixed-resolution encoding mode, a processing manner corresponding to each input video frame is obtained; the input video frame is processed according to the processing manner, to obtain a current frame to be encoded; and encoding is performed according to the current frame to be encoded, where the resolution of the current frame to be encoded may be the same as the resolution of the input video frame or may be lower than the resolution of the input video frame. The input video sequence includes current frame to be encodeds having different resolutions. Therefore, when the video sequence encoding mode is the mixed-resolution encoding mode, the video encoding method provided in the foregoing embodiment(s) is performed.

In an example embodiment, the obtaining the target video sequence encoding mode corresponding to the input video sequence includes: obtaining current environment information, the current environment information including at least one piece of the following information: current encoding environment information and current decoding environment information; and determining the target video sequence encoding mode corresponding to the input video sequence according to the current environment information.

Optionally, the environment information may include one or more of a processing capacity of a device that performs the video encoding method, a processing capacity of a device that performs the video decoding method, and current application scenario information. The processing capacity may be represented by a processing speed. For example, for a device with a strong processing capacity, the corresponding target video sequence encoding mode is the full-resolution encoding mode because the device has a high processing speed. When a current application scenario corresponding to the current application scenario information is a real-time application scenario, the video sequence encoding mode is the mixed-resolution encoding mode. When a current application scenario corresponding to the current application scenario information is a non-real-time application scenario, the video sequence encoding mode is the constant-resolution encoding mode. A correspondence between the current environment information and the video sequence encoding mode may be set. After the current environment information is obtained, the target video sequence encoding mode corresponding to the input video sequence is obtained according to the correspondence between the current environment information and the video sequence encoding mode. For example, a correspondence between the video sequence encoding mode and an average value of processing speeds of the device that performs the video encoding method and the device that performs the video decoding method may be set. After the processing speed of the device that performs the video encoding method and the processing speed of the device that performs the video decoding method are obtained, an average value of the processing speeds is calculated, and the target video sequence encoding mode is obtained according to the average value. Whether the current application scenario is a real-time application scenario may be set according to a requirement. For example, a video call application scenario and a game application scenario are real-time application scenarios; application scenarios corresponding to video encoding on a video website and encoding of an offline video are non-real-time application scenarios.

In an example embodiment, the operation of encoding the to-be-encoded frame under the resolution of the to-be-encoded frame to obtain encoded data corresponding to the input video frame includes: adding, to the encoded data, video sequence encoding mode information corresponding to the target video sequence encoding mode.

Optionally, the video sequence encoding mode information is used for describing an encoding mode used by the input video sequence, and a flag Sequence_Mix_Resolution_Flag for describing the video sequence encoding mode may be added to the encoded data. A specific value of the flag may be set according to a requirement. An adding position of the video sequence encoding mode information in the encoded data may be sequence-level header information. For example, when Sequence_Mix_Resolution_Flag is 1, the corresponding target video sequence encoding mode may be the mixed-resolution encoding mode. When Sequence_Mix_Resolution_Flag is 0, the corresponding target video sequence encoding mode may be the constant-resolution encoding mode.

Figure 9:
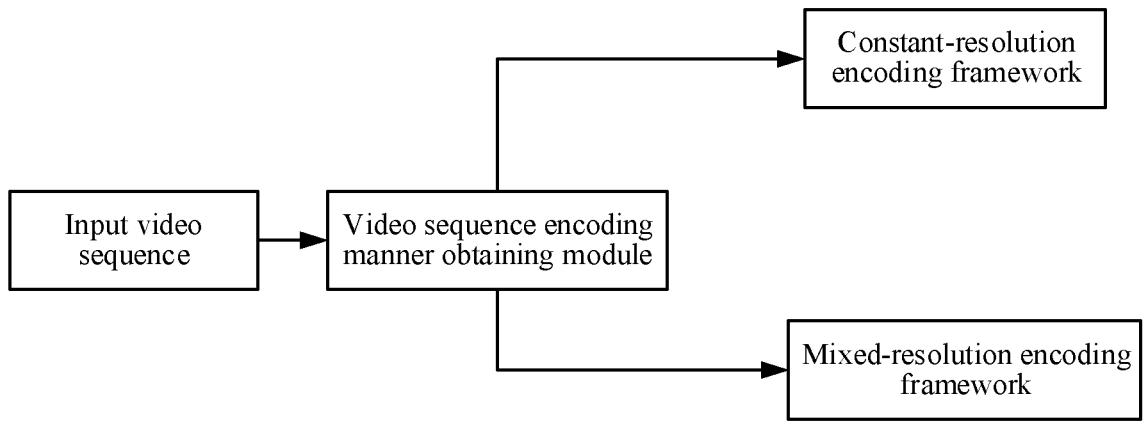
FIG. 9 is a schematic diagram of a video encoding framework according to an example embodiment.

A video encoding framework according to an example embodiment is shown in FIG. 9. The video encoding framework includes a constant-resolution encoding framework and a mixed-resolution encoding framework, and the mixed-resolution encoding framework may correspond to the encoding framework in FIG. 2. After the input video sequence is obtained, the video sequence encoding mode is determined at a video sequence encoding mode obtaining module. When the target video sequence encoding mode is the mixed-resolution encoding mode, the mixed-resolution encoding framework is used for encoding. When the target video sequence encoding mode is the constant-resolution encoding mode, the constant-resolution encoding framework shown in FIG. 9 is used for constant-resolution encoding. The constant-resolution encoding framework may be a current HEVC encoding framework or H.265 encoding framework.

The video encoding method is described in the following on the assumption that a video sequence A includes three input video frames: a, b, and c.

1. A target video sequence encoding mode corresponding to the video sequence A is obtained. Because a current environment is a video call environment, the target video sequence encoding mode is the mixed-resolution encoding mode.

2. A determination is made for the first input video frame a by using a processing deciding unit in the mixed-resolution encoding framework, to obtain that a processing manner is a downsampling manner, and a downsampling ratio is 1/2. The video frame a is downsampled, to obtain a video frame a1 after the downsampling. Intra-frame encoding is performed on the video frame a1 to obtain encoded data d1 corresponding to the video frame a1, and the encoded data corresponding to the video frame a1 is reconstructed, to obtain a corresponding reconstructed video frame a2.

3. A determination is made for the second input video frame b by using the processing deciding unit in the mixed-resolution encoding framework, to obtain that a processing manner is a downsampling manner, and a downsampling ratio is 1/4. The video frame b is downsampled, to obtain a video frame b1, the video frame b1 is encoded to obtain encoded data corresponding to the video frame b, and sampling ratio information corresponding to the downsampling ratio and processing manner information corresponding to the processing manner are included in the encoded data.

The encoding process includes: the reconstructed video frame a2 needs to be used as a reference frame because the video frame b is an inter-predicted frame, and the reconstructed video frame a2 needs to be sampled because the video frames b1 and a2 have different resolutions. It is determined that the sampling manner of the reconstructed video frame a2 is direct sub-pixel interpolation, and motion estimation precision is 1/4. Therefore, pixel interpolation precision is 1/4×2=1/2. 1/2 sub-pixel interpolation is performed on the reconstructed video frame a2 according to the pixel interpolation precision, to obtain a target reference frame a3. A first motion vector MV1 between a current code block in the video frame b1 and a target reference block in the target reference frame is calculated, and a prediction residual is p1. In addition, it is obtained that a target resolution is an original resolution. Therefore, the target motion vector is 4MV1. It is obtained through calculation that an initial predicted vector is MV2, and the initial predicted vector is obtained through calculation under a resolution corresponding to a downsampling ratio of 1/4. Therefore, a target predicted vector is 4MV2. Therefore, a motion vector difference MVD1 corresponding to the current code block is equal to 4MV1-4MV2. Transformation, quantization, and entropy encoding are performed on the motion vector difference MVD1 and the prediction residual p1, to obtain encoded data.

4. A determination is made for the third input video frame c by using the processing deciding unit in the mixed-resolution encoding framework, to obtain that a processing manner is a downsampling manner, and a downsampling ratio is 1/8. The video frame c is downsampled, to obtain a video frame c1, and the video frame c1 is encoded to obtain encoded data d2 corresponding to the video frame c.

The encoding process includes: because the video frame c is an inter-predicted frame, a corresponding reference frame is a reconstructed video frame b2 obtained by reconstructing encoded data of the video frame b; and the video frame b2 needs to be sampled because the video frames c1 and b2 have different resolutions. It is determined that the sampling manner of the video frame b2 is direct sub-pixel interpolation, and motion estimation precision is 1/4. Therefore, pixel interpolation precision is 1/4×2=1/2. 1/2 sub-pixel interpolation is performed on the video frame b2 according to the pixel interpolation precision, to obtain a target reference frame b3. A first motion vector MV3 between a current code block in the video frame c1 and a target reference block in the target reference frame is calculated, and a prediction residual is p2. In addition, it is obtained that a target resolution is an original resolution. Therefore, the target motion vector is 8MV3. It is obtained that an initial predicted vector is MV4, and the initial predicted vector is calculated under a resolution corresponding to a downsampling ratio of 1/4. Therefore, a target predicted vector is 4MV4. Therefore, a motion vector difference MVD2 corresponding to the current code block is equal to 8MV3-4MV4. Transformation, quantization, and entropy encoding are performed on the motion vector difference MVD2 and the prediction residual p2, to obtain encoded data d3.

5. An encoded data packet formed by the encoded data d1, d2, and d3 is used as encoded data corresponding to the video sequence, and is sent to a receiving terminal, where the encoded data corresponding to the video sequence includes a flag for describing that the target video sequence encoding mode is the mixed-resolution encoding mode.

Figure 10:
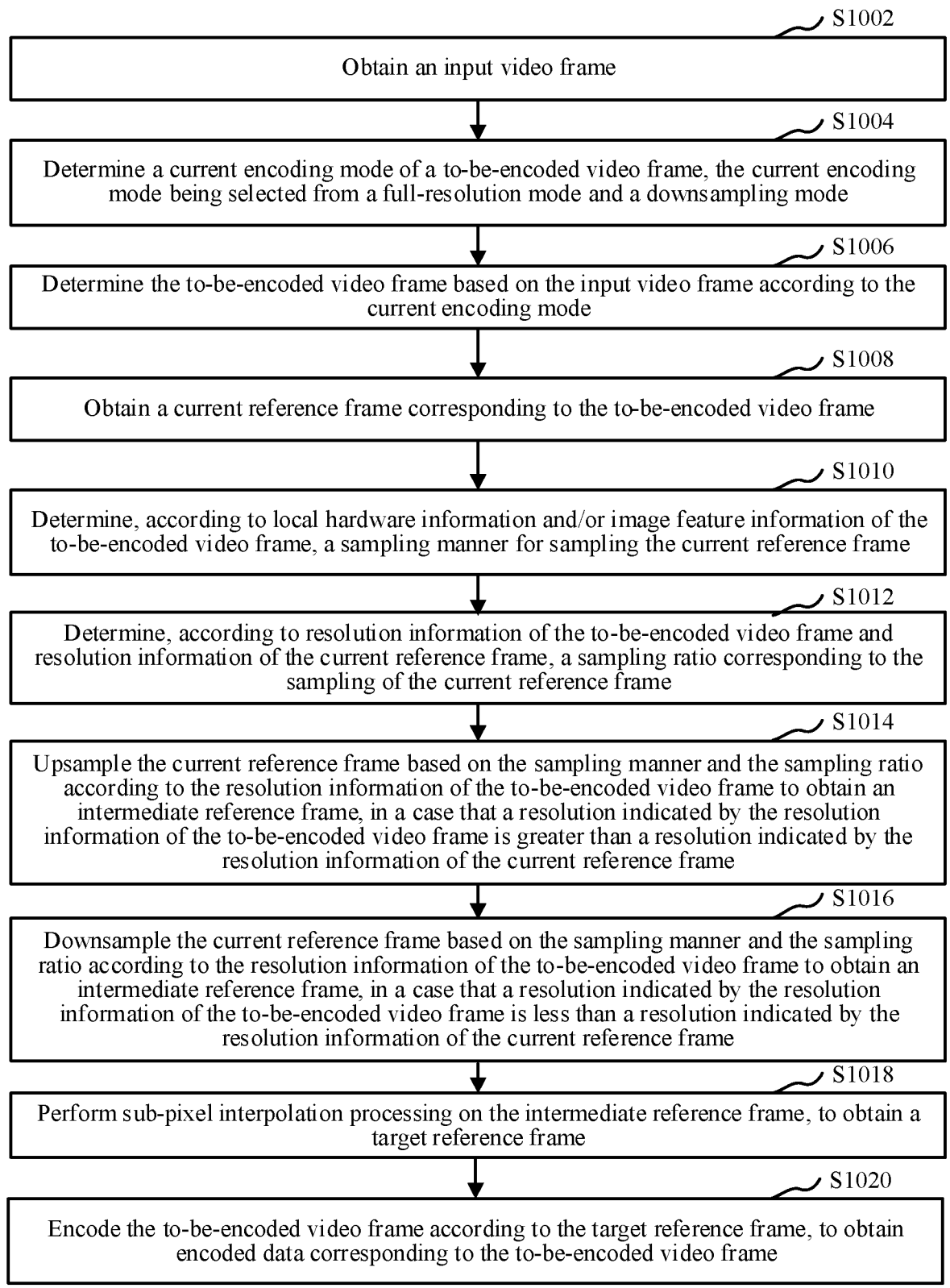
FIG. 10 is a schematic flowchart of a video encoding method according to another example embodiment.

As shown in FIG. 10, in an example embodiment, the video encoding method includes the following operations S1002-S1020.

S1002. Obtain an input video frame.

S1004. Determine a current encoding mode of the current frame to be encoded, the current encoding mode being selected from a full-resolution mode and a downsampling mode.

S1006. Determine the current frame to be encoded based on the input video frame and according to the current encoding mode.

S1008. Obtain a reference frame corresponding to the current frame to be encoded.

S1010. Determine, according to local hardware information and/or image feature information of the current frame to be encoded, a sampling manner for sampling the reference frame.

S1012. Determine, according to resolution information of the current frame to be encoded and resolution information of the reference frame, a sampling ratio corresponding to the sampling of the reference frame.

S1014. Upsample the reference frame based on the sampling manner and the sampling ratio according to the resolution information of the current frame to be encoded to obtain an intermediate reference frame, in a case that a resolution indicated by the resolution information of the current frame to be encoded is greater than a resolution indicated by the resolution information of the reference frame.

S1016. Downsample the reference frame based on the sampling manner and the sampling ratio according to the resolution information of the current frame to be encoded to obtain an intermediate reference frame, in a case that a resolution indicated by the resolution information of the current frame to be encoded is less than a resolution indicated by resolution information of the reference frame.

S1018. Perform sub-pixel interpolation processing on the intermediate reference frame, to obtain a target reference frame.

S1020. Encode the current frame to be encoded according to the target reference frame, to obtain encoded data corresponding to the current frame to be encoded.

In the foregoing video encoding, a sampling manner of a reference frame corresponding to a current frame to be encoded may be flexibly selected, and the reference frame is sampled according to the sampling manner to obtain a target reference frame. The current frame to be encoded is encoded according to the target reference frame, to reduce the data amount of to-be-encoded data. The sampling manner of the reference frame may be selected flexibly to perform sampling and reconstruction on the reference frame and adjust a resolution of the reference frame. Therefore, the reference frame, even if having a resolution different from that of the current current frame to be encoded, may still be used as a reference frame, thereby improving the use efficiency of the reference frame, improving the accuracy of inter-frame prediction, reducing a prediction residual, and improving the quality of an encoded image.

FIG. 10 is a schematic flowchart of a video encoding method according to an example embodiment. It is to be appreciated that, operations in the flowchart in FIG. 10 are displayed in sequence based on indication of arrows, but the operations are not necessarily performed sequentially based on the sequence indicated by the arrows. Unless otherwise explicitly specified in the disclosure, execution of the operations is not strictly limited, and the operations may be performed in other sequences. In addition, at least some operations in FIG. 10 may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

Figure 11:
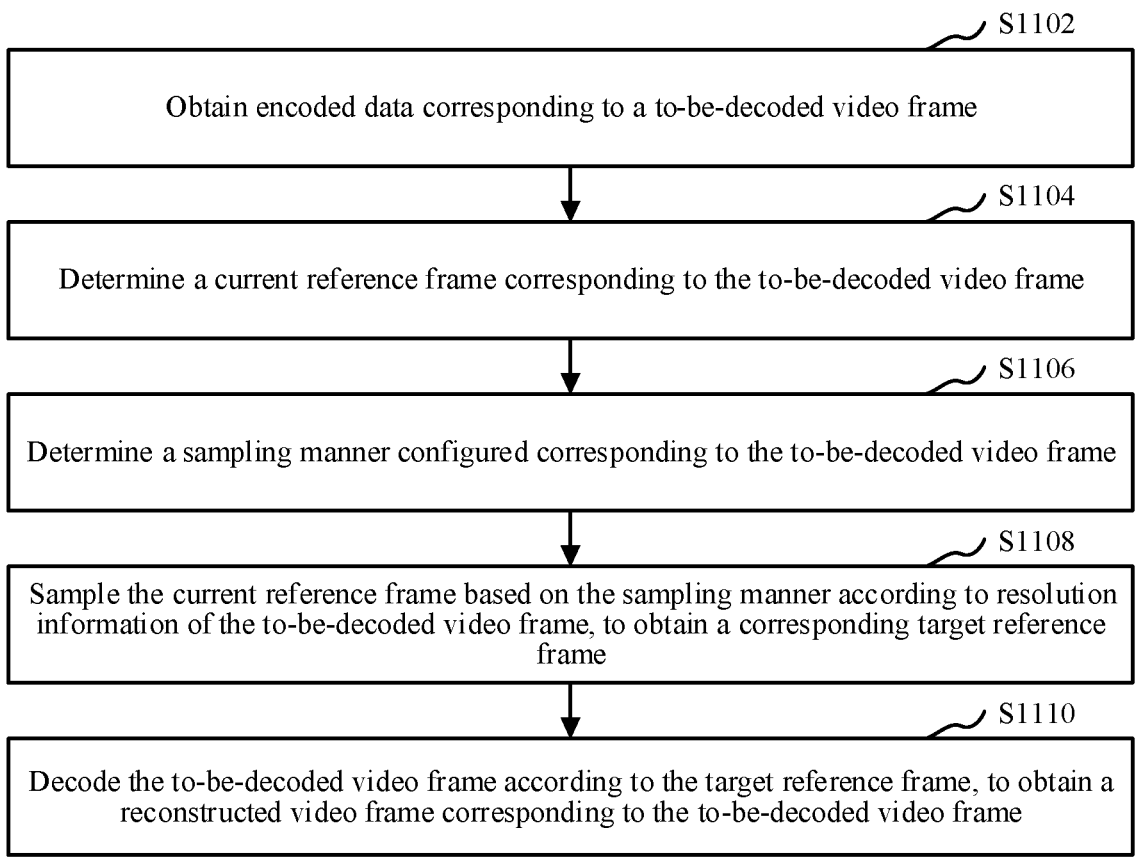
FIG. 11 is a schematic flowchart of a video decoding method according to an example embodiment.

As shown in FIG. 11, in an example embodiment, a video decoding method is provided. This embodiment is described by using an example in which the method is applied to the terminal 110 or the server 120 in FIG. 1. Referring to FIG. 11, the video decoding method includes the following operations S1102-1110.

S1102. Obtain encoded data corresponding to a current frame to be decoded.

The encoded data is data to be decoded. The encoded data may be obtained by an encoder side by encoding an input video frame according to a full-resolution processing manner, or may be obtained by the encoder side by downsampling an input video frame according to a downsampling processing manner and then encoding the downsampled video frame. Optionally, a decoder side may receive, through a network, the encoded data sent by the encoder side.

S1104. Determine a reference frame corresponding to the current frame to be decoded.

The reference frame is a video frame used as a reference during decoding of the current frame to be decoded. The reference frame is a video frame obtained by reconstructing encoded data corresponding to a video frame that can be used as a reference frame. According to different inter-frame prediction types, the reference frame corresponding to the current current frame to be decoded may be a forward reference frame or a bi-directional reference frame, and there may be one or more reference frames corresponding to the current frame to be decoded. The reference frame in the video decoding method corresponds to the reference frame in the video encoding method.

Optionally, after obtaining the encoded data corresponding to the reference frame, the decoder side may perform entropy decoding, inverse quantization, and inverse transformation on the encoded data, to obtain a prediction residual corresponding to each intra-frame prediction block, and then add up the prediction residual and a corresponding reference block to obtain each reconstructed block, thereby obtaining a reconstructed video frame of the input video frame, that is, the reference frame, for example, an I frame.

In an example embodiment, each reference frame corresponding to the current frame to be decoded may be cached, and a correspondence between the current frame to be decoded and the reference frame may be established. During decoding of the current frame to be decoded, the corresponding reference frame may be obtained directly. Resolution information corresponding to the reference frame may further be obtained. For example, for a GOP, a plurality of subsequent current frame to be decodeds may need to be referenced to the same prior reference frame.

For a manner in which the decoder side determines the reference frame, reference may be made to the manner in which the encoder side determines the reference frame in operation 504, and details are not described in this embodiment again.

S1106. Determine a sampling manner configured corresponding to the current frame to be decoded.

The sampling manner is a manner for sampling the video frame, and may include a sampling ratio and/or a sampling method. In this embodiment, the sampling manner may be a sampling manner for sampling the reference frame. The sampling the reference frame includes upsampling or downsampling the reference frame.

In an example embodiment, when the encoder side and the decoder side agree on a fixed sampling manner, the decoder side may sample the reference frame according to the agreed sampling manner.

In an example embodiment, the decoder side may determine the sampling manner corresponding to the current frame to be decoded according to local hardware information of a device that performs the video decoding method and/or image feature information of the current frame to be decoded.

In an example embodiment, in a case that the encoder side adds, to encoded data corresponding to a reference frame, sampling manner information for sampling the reference frame corresponding to a current frame to be encoded during encoding of the current frame to be encoded, the decoder side may read the sampling manner information from corresponding header information, and determine, according to the read sampling manner information, the sampling manner configured for the current frame to be decoded. In an example embodiment, in a case that the encoder side adds the sampling manner information to a preset position of frame-level header information, group-level header information or sequence-level header information corresponding to the encoded data, the decoder side may read the sampling manner information from the preset position of the corresponding frame-level header information, group-level header information or sequence-level header information.

S1108: Sample the reference frame based on the sampling manner according to resolution information of the current frame to be decoded, to obtain a corresponding target reference frame.

In an example embodiment, in a case that a resolution indicated by the resolution information of the current frame to be decoded is greater than a resolution indicated by resolution information of the reference frame, the reference frame is upsampled based on the sampling manner according to the resolution information of the current frame to be decoded, to obtain the corresponding target reference frame.

That a resolution indicated by the resolution information of the current frame to be decoded is greater than a resolution indicated by resolution information of the reference frame may be that: a current frame to be decoded in a full-resolution manner is referenced to a reference frame processed in a downsampling manner; alternatively, a current frame to be decoded processed in a downsampling manner is referenced to a reference frame processed in a downsampling manner, and a downsampling ratio of the current frame to be decoded is greater than a downsampling ratio of the reference frame.

In an example embodiment, the determining a sampling manner configured corresponding to the current frame to be decoded includes: determining, according to local hardware information and/or image feature information of the current frame to be decoded, a sampling manner for upsampling the reference frame.

For a process of determining the sampling manner by the decoder side, reference may be made to the process of determining the sampling manner by the encoder side in operation 508, and details are not described in this embodiment again.

S1110. Decode the current frame to be decoded according to the target reference frame, to obtain a reconstructed video frame corresponding to the current frame to be decoded.

Optionally, the reconstructed video frame is a video frame obtained through decoding and reconstruction. It may be appreciated that resolution information corresponding to the reconstructed video frame corresponds to the resolution information of the current frame to be encoded in the encoding process. If there is no loss of image information in the encoding process, the reconstructed video frame is the same as the current frame to be encoded. If there is a loss of image information in the encoding process, a difference between the reconstructed video frame and the current frame to be encoded corresponds to a loss value. The encoded data is decoded based on the resolution information corresponding to the current frame to be decoded. The decoding may include at least one of prediction, inverse transformation, inverse quantization, and entropy decoding, and may be determined according to the encoding process. During decoding, at least one of the reference frame, location information corresponding to each to-be-decoded block of the current frame to be decoded, location information corresponding to each reference block of the reference frame, and motion vector is processed according to the resolution information of the current frame to be decoded, where a processing method matches the processing method used during encoding performed by the encoder side. For example, a reference frame corresponding to the current frame to be decoded may be obtained, and the reference frame is processed according to the resolution information corresponding to the current frame to be decoded, to obtain a target reference frame. A target reference block is obtained according to motion vector information included in the encoded data, a predicted value corresponding to a to-be-decoded block is obtained according to the target reference block, and a reconstructed video frame is obtained according to a prediction residual in the encoded data and the predicted value.

In an example embodiment, the decoder side performs decoding according to the resolution information corresponding to the current frame to be decoded. After the reference frame is obtained, a reference block corresponding to a code block in the current frame to be decoded may be obtained from the reference frame, and the code block is decoded according to the reference block. Alternatively, the reference frame may be sampled according to the current frame to be decoded, to obtain the corresponding target reference frame. A target reference block corresponding to a to-be-decoded block in the current frame to be decoded is obtained from the target reference frame, and the code block is decoded according to the target reference block, to obtain a reconstructed video frame corresponding to the current frame to be decoded.

In an example embodiment, in a case that the encoder side transforms the location information, when corresponding location information is obtained in the decoding process, the location information needs to be transformed likewise, to maintain consistency of the target reference blocks obtained by the encoder side and the decoder side.

In an example embodiment, when the motion vector information included in the encoded data is a target motion vector, the target motion vector may be transformed according to target motion vector unit resolution information and the resolution information corresponding to the current frame to be decoded, to obtain a first motion vector under the resolution information corresponding to the current frame to be decoded, and the target reference block corresponding to the to-be-decoded block is obtained according to the first motion vector.

In an example embodiment, when the motion vector information included in the encoded data is a motion vector difference, an initial predicted motion vector corresponding to a current to-be-decoded block is obtained. A motion vector difference and a predicted motion vector that correspond to each to-be-decoded block are processed under the same resolution, to obtain a first motion vector that corresponds to the corresponding to-be-decoded block and that is under the resolution of the current frame to be decoded, and the target reference block corresponding to the to-be-decoded block is obtained according to the first motion vector.

Optionally, the decoder side may transform the initial predicted motion vector into a target predicted motion vector under a target resolution, obtain a target motion vector according to the target predicted motion vector and the motion vector difference, and then transform the target motion vector into the first motion vector under the resolution of the current frame to be decoded. Alternatively, the decoder side may transform the initial predicted motion vector into a predicted motion vector under the resolution of the current frame to be decoded, transform the motion vector difference into a motion vector difference under the resolution of the current frame to be decoded, and obtain the first motion vector according to the motion vector difference under the resolution of the current frame to be decoded and the predicted motion vector under the resolution of the current frame to be decoded.

In an example embodiment, the decoder side may determine a third vector transformation parameter according to the resolution information corresponding to the current frame to be decoded and first resolution information, where the first resolution information includes target motion vector unit resolution information; obtain a target motion vector corresponding to each to-be-decoded block in the current frame to be decoded according to the encoded data; obtain a target reference block corresponding to each to-be-decoded block in the current frame to be decoded according to the third vector transformation parameter and the target motion vector; and decode the encoded data according to the target reference blocks, to obtain the reconstructed video frame corresponding to the current frame to be decoded.

Optionally, the third vector transformation parameter is used for transforming a motion vector or location information for obtaining the motion vector. The third vector transformation parameter may be a ratio between the first resolution information and the resolution information of the current frame to be decoded, and the third vector transformation parameter corresponds to the first vector transformation parameter. When the third vector transformation parameter is used for transforming the target motion vector, the target motion vector may be transformed into a corresponding motion vector under the resolution corresponding to the current frame to be decoded. In this case, the third vector transformation parameter may be a reciprocal of the first vector transformation parameter. When the third vector transformation parameter is used for transforming the location information corresponding to the motion vector, if the first vector transformation parameter in the encoder side is used for transforming first location information corresponding to a current code block, the third vector transformation parameter is the same as the first vector transformation parameter because the to-be-decoded block has the same location information as the code block. If the first vector transformation parameter in the encoder side is used for transforming second location information corresponding to a target reference block that corresponds to the current code block, the third vector transformation parameter is a reciprocal of the first vector transformation parameter because a location value calculated according to the target motion vector and the first location information is a location value obtained after the second location information is transformed in the encoder side according to the first vector transformation parameter.

Further, when the encoded data includes the target motion vector, the decoder side reads the target motion vector from the encoded data. When the encoded data includes the motion vector difference, the target predicted motion vector may be obtained through calculation, and the target motion vector is obtained according to the motion vector difference and the target predicted motion vector.

Further, after obtaining the third vector transformation parameter, the decoder side transforms the obtained motion vector or the location information corresponding to the motion vector according to the third vector transformation parameter, to obtain location information corresponding to the target reference block, thereby obtaining the target reference block.

Further, after obtaining the target reference block, the decoder side obtains a pixel value of each image block of the reconstructed video frame according to a pixel value of the target reference block and the prediction residual of the to-be-decoded block included in the encoded data, thereby obtaining the reconstructed video frame.

In an example embodiment, the operation of determining a third vector transformation parameter according to the resolution information corresponding to the current frame to be decoded and first resolution information includes: determining the third vector transformation parameter according to the resolution information corresponding to the current frame to be decoded and the resolution information of the reference frame. The operation of obtaining a target reference block corresponding to each to-be-decoded block in the current frame to be decoded according to the third vector transformation parameter and the target motion vector includes: obtaining first location information corresponding to the current to-be-decoded block; and obtaining the target reference block corresponding to the current to-be-decoded block according to the first location information, the third vector transformation parameter and the target motion vector.

Optionally, the decoder side may obtain second location information corresponding to the target reference block according to the first location information, the third vector transformation parameter, and the target motion vector, and obtain the target reference block according to the second location information. Based on the correspondence between encoding and decoding, if the first vector transformation parameter in the encoder side is used for transforming the first location information, the third vector transformation parameter is the same as the first vector transformation parameter because the to-be-decoded block has the same location information as the code block. If the first vector transformation parameter in the encoder side is used for transforming the second location information, the third vector transformation parameter is a reciprocal of the first vector transformation parameter because a location value calculated according to the target motion vector and the first location information is a location value obtained after the second location information is transformed in the encoder side according to the first vector transformation parameter.

For example, the resolution of the current frame to be decoded is 1200×1200 pixels, and the resolution of the reference frame is 600×600 pixels. If the first vector transformation parameter is used for transforming the second location information, and the first vector transformation parameter is 2, the third vector transformation parameter is 1/2. Assuming that the first location information is (6, 8) and the target motion vector is (0, 2), intermediate location information is (6, 8)-(0, 2)=(6, 6), and the second location information corresponding to the target reference block is (6×1/2, 6×1/2)=(3, 3).

For example, the resolution of the current frame to be decoded is 1200×1200 pixels, the resolution of the reference frame is 600×600 pixels, the first vector transformation parameter is used for transforming the first location information, and the first vector transformation parameter is 1/2. In this case, the third vector transformation parameter is 1/2. Assuming that the first location information is (6, 8), the target motion vector is (0, 1). In this case, the second location information is (6×1/2, 8×1/2)-(0, 1)=(3, 3).

In an example embodiment, the operation of determining a third vector transformation parameter according to the resolution information corresponding to the current frame to be decoded and first resolution information includes: determining the third vector transformation parameter according to the resolution information corresponding to the current frame to be decoded and target motion vector unit resolution information. The operation of obtaining a target reference block corresponding to each to-be-decoded block in the current frame to be decoded according to the third vector transformation parameter and the target motion vector includes: obtaining a first motion vector according to the target motion vector and the third vector transformation parameter; and obtaining the target reference block corresponding to the current to-be-decoded block according to the first motion vector.

Optionally, the third vector transformation parameter is determined according to the resolution information corresponding to the current frame to be decoded and the target motion vector unit resolution information, and is used for transforming the target motion vector into the corresponding first motion vector under the resolution corresponding to the current frame to be decoded. After obtaining the third vector transformation parameter, the decoder side may multiply the third vector transformation parameter by the target motion vector, and use an obtained product as the first motion vector. It may be appreciated that, the process of obtaining the first motion vector according to the third vector transformation parameter and the target motion vector is an inverse process of obtaining the target motion vector corresponding to the current code block according to the first vector transformation parameter and the first motion vector. For example, in the encoder side, the first vector transformation parameter of the code block corresponding to the to-be-decoded block is equal to 2. The obtained first motion vector is (2, 2), and it is obtained that the target motion vector is (4, 4) according to a product of the first vector transformation parameter and the first motion vector (2, 2). In this case, in the decoding process, the third vector transformation parameter is 1/2, the obtained target motion vector is (4, 4), and it is obtained that the first motion vector is (2, 2) according to a product of the third vector transformation parameter 1/2 and the target motion vector (4, 4).

In an example embodiment, when the encoded data includes the motion vector difference, the operation of obtaining a target motion vector corresponding to each to-be-decoded block in the current frame to be decoded according to the encoded data includes: obtaining a motion vector difference corresponding to a current to-be-decoded block in the current frame to be decoded according to the encoded data; obtaining an initial predicted motion vector corresponding to the current to-be-decoded block; obtaining a second vector transformation coefficient according to current motion vector unit resolution information corresponding to the initial predicted motion vector and target motion vector unit resolution information; obtaining a target predicted motion vector corresponding to the current to-be-decoded block according to the initial predicted motion vector and the second vector transformation coefficient; and obtaining the target motion vector according to the target predicted motion vector and the motion vector difference.

In an example embodiment, because the to-be-decoded block in the decoding process and the to-be-encoded block in the encoding process correspond to each other, and rules for obtaining the initial predicted motion vectors are the same. Therefore, the initial predicted motion vector corresponding to the current to-be-decoded block is consistent with the initial predicted motion vector corresponding to the current to-be-encoded block. For a method for obtaining the target predicted motion vector, reference may be made to the method in the encoding process, and details are not described again. The target motion vector is a sum of the target predicted motion vector and the motion vector difference.

According to the foregoing video decoding method, a sampling manner of a reference frame corresponding to a current frame to be decoded may be flexibly selected, and the reference frame is sampled according to the sampling manner to obtain a target reference frame. Then, the current frame to be decoded is decoded according to the target reference frame, to obtain a reconstructed video frame. The sampling manner of the reference frame may be selected flexibly to perform sampling and reconstruction on the reference frame and adjust a resolution of the reference frame. Therefore, the reference frame, even if having a resolution different from that of the current current frame to be decoded, may still be used as a reference frame, thereby improving the use efficiency of the reference frame, improving the accuracy of inter-frame prediction, reducing a prediction residual, and improving the quality of a decoded image.

In an example embodiment, the operation of sampling the reference frame based on the sampling manner according to resolution information of the current frame to be decoded to obtain a corresponding target reference frame includes: sampling the reference frame based on the sampling manner according to the resolution information of the current frame to be decoded, to obtain an intermediate reference frame; and performing sub-pixel interpolation processing on the intermediate reference frame to obtain the target reference frame.

Optionally, in the process of decoding the current frame to be decoded, a reference block corresponding to a code block in the current frame to be decoded needs to be determined in the reference frame by using a motion search technology. A motion vector is calculated according to motion information of the code block relative to the reference block. The motion vector is decoded to inform the decoder side of a location of reference data corresponding to the reference block in the reference frame. Therefore, sub-pixel interpolation processing is performed on the intermediate reference frame to obtain a target reference frame, so that motion estimation may be performed on the current frame to be decoded according to the target reference frame with a higher resolution, thereby improving the accuracy of motion estimation and improving the quality of the decoded video.

In an example embodiment, the reference frame is sampled based on the determined sampling manner according to the resolution information of the current frame to be decoded, to obtain an intermediate reference frame, and the intermediate reference frame may be directly used as the target reference frame.

In an example embodiment, the decoder side may sample the reference frame based on the determined sampling manner according to the resolution information of the current frame to be decoded, to obtain an intermediate reference frame. Sub-pixel interpolation processing is performed on the intermediate reference frame, to obtain the target reference frame.

In an example embodiment, the encoder side may specify, in the respective encoding/decoding rule, a sub-pixel interpolation manner used for processing according to the intermediate reference frame to obtain the target reference frame. During decoding, the decoder side may read configuration information, to determine the sub-pixel interpolation manner corresponding to processing of the intermediate reference frame. The sub-pixel interpolation manner used by the decoder side is consistent with that used by the encoder side.

In an example embodiment, when the encoder side encodes the input video frame by using an adaptive-resolution encoding framework, sub-pixel interpolation manner information corresponding to the sub-pixel interpolation manner is added to the encoded data corresponding to the input video frame. For example, the sub-pixel interpolation manner information is added to corresponding sequence-level header information, group-level header information or frame-level header information. During decoding, the decoder side may read the sub-pixel interpolation manner information from the corresponding sequence-level header information, group-level header information or frame-level header information, determine the sub-pixel interpolation manner for the intermediate reference frame according to the read sub-pixel interpolation manner information, to process the intermediate reference frame to obtain the target reference frame, so that a reconstructed video frame may be obtained by decoding the encoded data according to the target reference frame.

The current frame to be decoded and the current frame to be encoded have the same resolution, and the obtained target reference frames also have the same resolution. Therefore, the operation of sampling the reference frame according to the resolution information corresponding to the current frame to be decoded to obtain an intermediate reference frame, and performing sub-pixel interpolation processing on the intermediate reference frame to obtain the target reference frame is the same as that in the encoder side, and details are not described again in this embodiment of the disclosure.

In the foregoing embodiment, the reference frame is sampled to obtain an intermediate reference frame, and then sub-pixel interpolation processing is performed on the intermediate reference frame to obtain the target reference frame. Sub-pixel interpolation processing is performed on the intermediate reference frame, to further improve a degree of image matching between the current frame to be decoded and a frame to be referenced to, thereby greatly improving the pixel precision of motion estimation, reducing a prediction residual, and improving the quality of a decoded image.

In an example embodiment, the operation of sampling the reference frame based on the sampling manner according to resolution information of the current frame to be decoded to obtain a corresponding target reference frame includes: determining, according to the resolution information of the current frame to be decoded and resolution information of the reference frame, a sampling ratio corresponding to the sampling of the reference frame; and sampling the reference frame according to the sampling manner and the sampling ratio, to obtain the corresponding target reference frame.

For a process of obtaining the target reference frame by the decoder side, reference may be made to the process of obtaining the target reference frame by the encoder side in the foregoing embodiment, and details are not described in this embodiment again.

In an example embodiment, in a case that the encoder side adds the sampling ratio information to the frame-level header information, group-level header information, or sequence-level header information, the decoder side may directly read the sampling ratio information in the header information from the corresponding position during decoding. The decoder side determines, according to the sampling ratio information, a sampling ratio for sampling the reference frame.

In the foregoing embodiment, the sampling ratio corresponding to the sampling of the reference frame is determined according to the resolution information of the current frame to be decoded and the resolution information of the reference frame, and then the reference frame is sampled according to the determined sampling ratio, so that an appropriate target reference frame may be obtained, for example, a target reference frame having a resolution consistent with that of the current frame to be decoded, thereby facilitating subsequent video encoding.

In an example embodiment, the video decoding method further includes: determining a current decoding mode corresponding to the current frame to be decoded according to current encoding mode information included in the encoded data; and processing the reconstructed video frame corresponding to the current frame to be decoded according to the current decoding mode to obtain a decoded video frame.

Optionally, each encoded video frame corresponding to the encoded data may carry current encoding mode information, and the decoder side may determine a current decoding mode corresponding to the current decoded video frame according to the current encoding mode information. The decoder side may process the reconstructed video frame according to the current decoding mode, to obtain a decoded video frame.

In an example embodiment, the decoder side may obtain the current encoding mode information included in the encoded data from the header information of the encoded data, and determine the current decoding mode corresponding to the current frame to be decoded according to the current encoding mode information. After obtaining the reconstructed video frame corresponding to the current frame to be decoded, the decoder side may process the reconstructed video frame according to the current decoding mode, to obtain the decoded video frame. The header information may be frame-level header information of the encoded data, indicating a processing manner used during encoding of the input video frame corresponding to the current encoded data. For example, when the flag Frame_Resolution_Flag for determining the processing manner in the frame-level header information of the encoded data is 0, it indicates that all input video frames are processed in a full-resolution processing manner during encoding, and therefore the reconstructed video frame obtained by the decoder side by decoding the encoded data is a decoded video frame corresponding to the current frame to be decoded; when Frame_Resolution_Flag is 1, it indicates that the input video frame is processed in a downsampling processing manner during encoding, and the decoder side may perform further processing on the obtained reconstructed video frame according to a processing manner matching the downsampling processing manner, to obtain the decoded video frame. The further processing is, for example, upsampling.

In an example embodiment, when the input video frame is processed in a downsampling manner during encoding, the decoder side may upsample the reconstructed video frame according to the configured upsampling manner, to obtain the decoded video frame. In this embodiment, the decoder side may upsample the reconstructed video frame by using a sampling manner for upsampling the reference frame, to obtain decoded video frames having a uniform resolution.

In an example embodiment, when the decoder side determines, according to the header information of the encoded data, that the current encoded data is obtained through encoding in a downsampling processing manner, and obtains, from the header information, the upsampling processing manner configured for the corresponding current frame to be decoded, the decoder side may determine an upsampling method and an upsampling ratio according to the read sampling manner information, and upsample the reconstructed video frame to obtain the decoded video frame.

In an example embodiment, a decoding framework corresponding to the current frame to be decoded may be determined from the header information of the encoded data. Optionally, the decoder side may obtain, from the sequence-level header information corresponding to the encoded data, an encoding framework used during encoding of each input video frame in the input video frame sequence corresponding to the current encoded data, thereby determining the matching decoding framework corresponding to the current frame to be decoded. For example, when a flag Sequence_Mix_Flag for determining the used encoding framework in the sequence-level header information of the encoded data is 0, it indicates that a constant-resolution encoding framework is used during encoding of each input video frame in the input video frame sequence, and in this case, the decoder side may use a constant-resolution decoding framework to decode the encoded data to obtain the reconstructed video frame corresponding to the current frame to be decoded. When Sequence_Mix_Flag is 1, it indicates that an adaptive-resolution encoding framework is used during encoding of each input video frame in the input video frame sequence, and in this case, the decoder side may use an adaptive-resolution decoding framework to decode the encoded data, to obtain a reconstructed video frame sequence.

In an example embodiment, when decoding the encoded data by using the adaptive-resolution decoding framework, the decoder side may further determine a processing manner corresponding to the current current frame to be decoded according to a decision algorithm. The decision algorithm is to match a decision algorithm used by the encoder side during encoding of the input video frame.

In an example embodiment, when the decoder side determines, according to the header information of the encoded data, that the current encoded data is obtained through encoding in a downsampling processing manner, the decoder side may further obtain used downsampling ratio information or downsampling method information from the header information, and upsample the reconstructed video frame by using an upsampling ratio or an upsampling method matching the downsampling ratio information or the downsampling method information, to obtain the decoded video frame. For example, if a sampling ratio corresponding to the downsampling ratio information is 1/2, the decoder side needs to upsample the reconstructed video frame according to an upsampling ratio of 2 and an upsampling method matching the downsampling method information, to obtain the decoded video frame. The decoder side may obtain the downsampling ratio information or the downsampling method information corresponding to the current encoded data from any one of the sequence-level header information, group-level header information, and frame-level header information.

In the foregoing embodiment, the current decoding mode of the current frame to be decoded may be determined adaptively, so that appropriate resolutions may be selected adaptively for decoding for different scenarios. The reconstructed video frame corresponding to the current frame to be decoded is processed according to the current decoding mode corresponding to the current encoding mode, to obtain the decoded video frame. For a code stream encoded in an adaptive variation mode, a reference frame resolution is adjusted adaptively for decoding. The code stream encoded in an adaptive variation mode is a code stream that is encoded by selecting appropriate resolutions for different scenarios, thereby supporting decoding of a code stream with high image quality.

In an example embodiment, a proportion of decode blocks of a target prediction type in a forward decoded video frame corresponding to the current frame to be decoded may further be calculated; the processing manner corresponding to the current frame to be decoded is determined according to the proportion; and the resolution information corresponding to the current frame to be decoded is obtained according to the processing manner.

Optionally, the decoded block of the target prediction type corresponds to the code block of the target prediction type. The forward decoded video frame is a video frame decoded before the current frame to be decoded. The forward decoded video frame and the forward encoded video frame also correspond to each other. Therefore, a calculation method and result of the proportion of the code blocks of the target prediction type obtained by the encoder side are the same as those of the proportion of the decoded blocks of the target prediction type obtained by the decoder side. For the method for obtaining the proportion of the decoded blocks of the target prediction type, reference may be made to the method for obtaining the proportion of the code blocks of the target prediction type, and details are not described herein again. After the processing manner is obtained, when the processing manner is a full-resolution processing manner, the corresponding resolution information is an original resolution. When the processing manner is a downsampling manner, a preset downsampling ratio is obtained, or the downsampling ratio is obtained from the header information of the encoded data.

In an example embodiment, a proportion of intra-frame decoded blocks in the forward decoded video frame to the forward decoded video frame may be calculated, and when the proportion is greater than a target threshold, it is determined that the processing manner is the downsampling processing manner.

When the proportion corresponding to the intra-frame decoded blocks is greater than the target threshold, it is determined that the target processing manner corresponding to the current frame to be decoded is the downsampling processing manner; otherwise, it is determined that the target processing manner corresponding to the video frame is the full-resolution processing manner. For example, when the proportion is greater than the target threshold, it is determined that the processing manner corresponding to the current frame to be decoded is the downsampling processing manner; otherwise, it is determined that the target processing manner corresponding to the video frame is the full-resolution processing manner.

The target threshold may be determined according to a processing manner of a reference frame corresponding to the current frame to be decoded. When the processing manner of the reference frame corresponding to the current frame to be decoded is a downsampling manner, a first preset threshold T1 is obtained, and the first preset threshold T1 is used as the target threshold. Similarly, when the processing manner of the reference frame corresponding to the current frame to be decoded is a full-resolution processing manner, a second preset threshold T2 is obtained, and the second preset threshold T2 is used as the target threshold. Further, after the target threshold is obtained according to resolution information of the reference frame corresponding to the current frame to be decoded, the processing manner of the current frame to be decoded is determined according to the target threshold and the proportion of the intra-frame decoded blocks in the forward decoded video frame to the forward decoded video frame. When the proportion of intra-frame decoded blocks in the forward decoded video frame to the forward decoded video frame is greater than the target threshold, it is determined that the processing manner corresponding to the current frame to be decoded is the downsampling processing manner.

In an example embodiment, before the obtaining encoded data corresponding to a current frame to be decoded, the video decoding method further includes: obtaining a to-be-decoded video sequence corresponding to the current frame to be decoded, and obtaining a video sequence decoding mode corresponding to the to-be-decoded video sequence, where the video sequence decoding mode includes a constant-resolution decoding mode or a mixed-resolution decoding mode; when the video sequence decoding mode is the mixed-resolution decoding mode, performing a mixed-resolution decoding method on each current frame to be decoded of the to-be-decoded video sequence; and when the video sequence decoding mode is the constant-resolution decoding mode, performing constant-resolution decoding on the to-be-decoded video sequence.

Optionally, the decoder side may obtain video sequence encoding mode information from the encoded data, and obtain the video sequence decoding mode according to the video sequence encoding mode information. For example, when the video sequence encoding mode corresponding to the video sequence encoding mode information is the constant-resolution encoding mode, the corresponding video sequence decoding mode is the constant-resolution decoding mode. In the constant-resolution decoding mode, each current frame to be decoded in the video sequence has the same resolution. When the video sequence encoding mode corresponding to the video sequence encoding mode information is the mixed-resolution encoding mode, the corresponding video sequence decoding mode is the mixed-resolution decoding mode.

In an example embodiment, the decoder side may determine the decoding framework corresponding to the current frame to be decoded from the header information of the encoded data. Optionally, the decoder side may obtain, from the sequence-level header information corresponding to the encoded data, an encoding framework used during encoding of each input video frame in the input video frame sequence corresponding to the current encoded data, thereby determining the matching decoding framework corresponding to the current frame to be decoded. For example, when a flag Sequence_Mix_Flag for determining the used encoding framework in the sequence-level header information of the encoded data is 0, it indicates that a constant-resolution encoding framework is used during encoding of each input video frame in the input video frame sequence, and in this case, the decoder side may use a constant-resolution decoding framework to decode the encoded data to obtain the reconstructed video frame corresponding to the current frame to be decoded. When Sequence_Mix_Flag is 1, it indicates that a mixed-resolution encoding framework is used during encoding of each input video frame in the input video frame sequence, and in this case, the decoder side may use a mixed-resolution decoding framework to decode the encoded data, to obtain a reconstructed video frame sequence.

In an example embodiment, the obtaining the video sequence decoding mode corresponding to the to-be-decoded video sequence may include: obtaining current environment information, the current environment information including at least one piece of the following information: current encoding environment information and current decoding environment information; and determining a target video sequence decoding mode corresponding to the to-be-decoded video sequence according to the current environment information.

Optionally, the decoder side may also obtain the corresponding target video sequence decoding mode according to the method for calculating the video sequence encoding mode by the encoder side. Therefore, in this embodiment of the disclosure, the operation of determining the target video sequence decoding mode according to the current environment information is consistent with the operation of determining the target video sequence encoding mode according to the current environment information, and details are not described herein again.

In an example embodiment, when the current environment information includes an application scenario corresponding to the to-be-decoded video sequence, the video sequence decoding mode corresponding to the to-be-decoded video sequence may be obtained according to the application scenario.

In the following, decoding of encoded data corresponding to a video sequence A is used as an example to describe the video decoding method. It is assumed that at the decoder side, names of current frame to be decodeds corresponding to input video frames a, b, and c are e, f, and g respectively.

1. A receiving terminal obtains encoded data corresponding to the video sequence A, and obtains, from sequence header information corresponding to the encoded data, that a target video sequence encoding mode is a mixed-resolution encoding mode. Therefore, the encoded data is decoded by using a mixed-resolution decoding framework.

2. A resolution information obtaining unit of the mixed-resolution decoding framework obtains resolution information corresponding to the first current frame to be decoded e. It may be appreciated that, encoded data corresponding to the current frame to be decoded e is data obtained by encoding the video frame a1 that is obtained after downsampling the input video frame a. Intra-frame decoding is performed on the current frame to be decoded e, to obtain a reconstructed video frame e1. Because resolution information corresponding to the current frame to be decoded e is 1/2, the reconstructed video frame e1 may be upsampled by using a sampling ratio of 2, to obtain a decoded video frame e2.

3. The resolution information obtaining unit of the mixed-resolution decoding framework obtains resolution information corresponding to the second current frame to be decoded f. It may be appreciated that, encoded data corresponding to the current frame to be decoded f is data obtained by encoding the video frame b1 that is obtained after downsampling the input video frame b. Inter-frame decoding is performed on the current frame to be decoded f, to obtain a reconstructed video frame f1. Because resolution information corresponding to the vide frame f is a downsampling ratio of 1/4, the reconstructed video frame f1 may be upsampled by using a sampling ratio of 4, to obtain a decoded video frame f2.

A decoding process is as follows: because the current frame to be decoded f is an inter-predicted frame, the reconstructed video frame e1 needs to be used as a reference frame. It may be appreciated that the reconstructed video frame e1 is the same as the reconstructed video frame a2 that is obtained by reconstructing the encoded data corresponding to the video frame a1, and reconstructed video frame e1 is sampled in the same manner as the reconstructed video frame a2, to obtain a video frame e3. Herein, the video frame e3 is the same as the target reference frame a3 corresponding to the reconstructed video frame a2, and is used as a target reference frame. It is obtained from the encoded data that a motion vector difference corresponding to the current to-be-decoded block is MVD1. Because MVD1 is obtained under a target resolution, that is, an original resolution, MVD1 needs to be converted into a motion vector difference under a resolution corresponding to f Therefore, it may be obtained that MVD3 is MVD1/4. It is obtained that an initial predicted vector is MV2, and the initial predicted vector is calculated under a resolution corresponding to a downsampling ratio of 1/4, and this resolution is the same as the resolution corresponding to f Therefore, it may be obtained that a first motion vector MV1 is equal to MVD1/4+MV2. A target reference block is obtained according to MV1. A predicted value corresponding to the to-be-decoded block is obtained according to the target reference block, and a prediction residual p1 is added to the predicted value to obtain a reconstructed block corresponding to the reconstructed video frame f1 through reconstruction.

4. The resolution information obtaining unit of the mixed-resolution decoding framework obtains encoded data corresponding to the third current frame to be decoded g. It may be appreciated that, encoded data corresponding to g is data obtained by encoding the video frame c1 obtained after downsampling the input video frame c. Inter-frame decoding is performed on the third current frame to be decoded g, to obtain a reconstructed video frame g1. Because the resolution information corresponding to g is 1/8, the reconstructed video frame g1 may be upsampled by using a sampling ratio of 8, to obtain a decoded video frame g2.

A decoding process is as follows: because the third current frame to be decoded g is an inter-predicted frame, the reconstructed video frame f1 needs to be used as a reference frame. It may be appreciated that, the reconstructed video frame f1 is the same as the reconstructed video frame b2 that is obtained by reconstructing the encoded data corresponding to the video frame b1, and the reconstructed video frame f1 is sampled in the same manner as the reconstructed video frame b2, to obtain a video frame f3. Herein, the video frame f3 is the same as the target reference frame b3 corresponding to the reconstructed video frame b2, and is used as a target reference frame. It is obtained from the encoded data that a motion vector difference corresponding to the current to-be-decoded block is MVD2. Because MVD2 is under a target resolution, that is, an original resolution, MVD2 needs to be converted into a motion vector difference under a resolution corresponding to g. Therefore, it may be obtained that MVD2 is MVD1/8. It is obtained that an initial predicted vector is MV4. Because the initial predicted vector is calculated under a resolution corresponding to a downsampling ratio of 1/4, the initial predicted vector needs to be transformed into a predicted vector under a resolution corresponding to f A downsampling ratio corresponding to f is 1/8, and therefore, it may be obtained that a first motion vector MV3 is equal to MVD2/8+MV4/2. A target reference block is obtained according to MV3. A predicted value corresponding to the to-be-decoded block is obtained according to the target reference block, and a prediction residual p2 is added to the predicted value to obtain a reconstructed block corresponding to the reconstructed video frame g1 through reconstruction.

5. The receiving terminal plays e2, f2, and g2.

Figure 12:
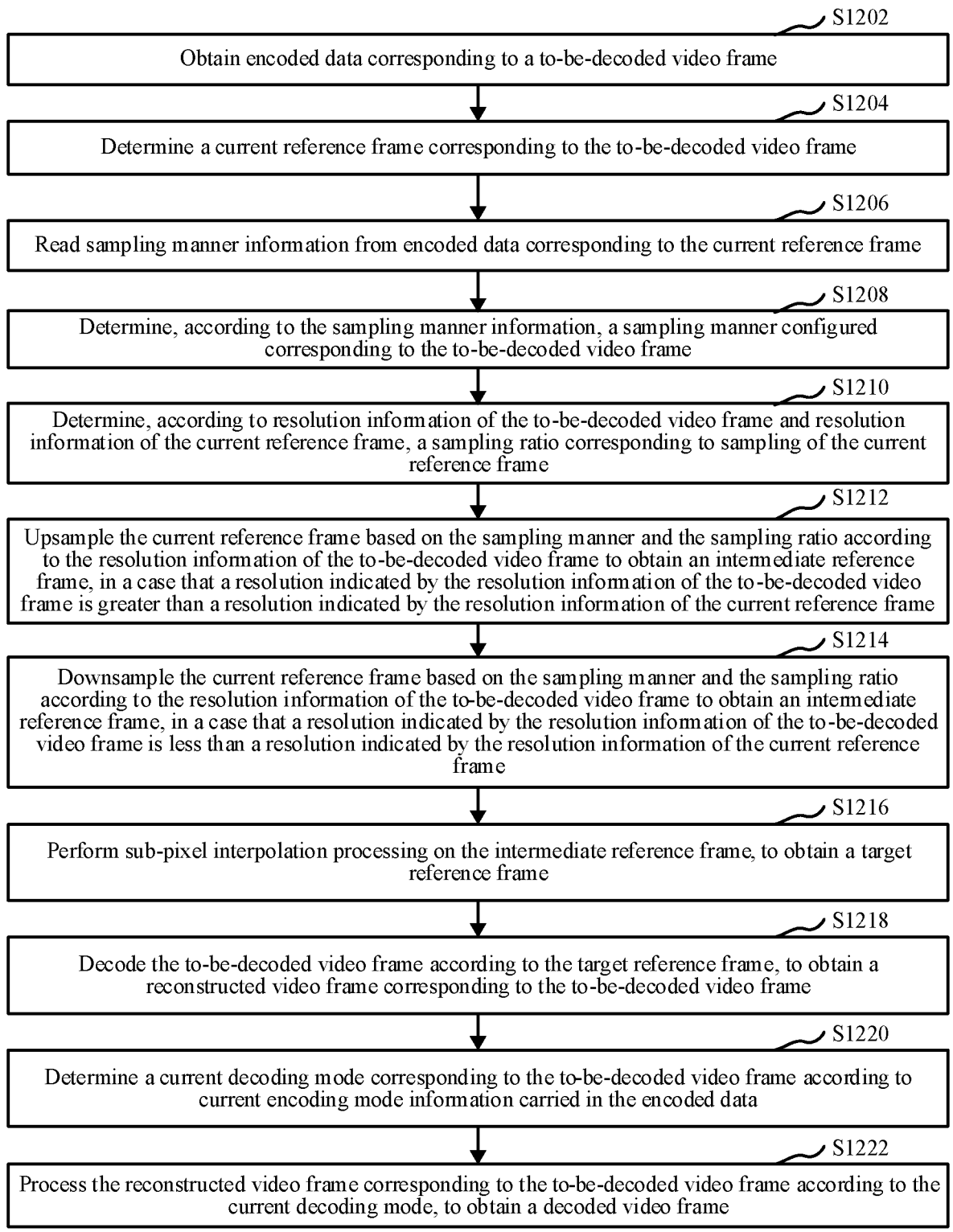
FIG. 12 is a schematic flowchart of a video decoding method according to another example embodiment.

As shown in FIG. 12, in an example embodiment, the video decoding method includes the following operations.

S1202. Obtain encoded data corresponding to a current frame to be decoded.

S1204. Determine a reference frame corresponding to the current frame to be decoded.

S1206. Read sampling manner information from encoded data corresponding to the reference frame.

S1208. Determine, according to the sampling manner information, a sampling manner configured corresponding to the current frame to be decoded.

S1210. Determine, according to resolution information of the current frame to be decoded and resolution information of the reference frame, a sampling ratio corresponding to a sampling of the reference frame.

S1212. Upsample the reference frame based on the sampling manner and the sampling ratio according to the resolution information of the current frame to be decoded to obtain an intermediate reference frame, in a case that a resolution indicated by the resolution information of the current frame to be decoded is greater than a resolution indicated by the resolution information of the reference frame.

S1214. Downsample the reference frame based on the sampling manner and the sampling ratio according to the resolution information of the current frame to be decoded to obtain an intermediate reference frame, in a case that a resolution indicated by the resolution information of the current frame to be decoded is less than a resolution indicated by the resolution information of the reference frame.

S1216. Perform sub-pixel interpolation processing on the intermediate reference frame, to obtain a target reference frame.

S1218. Decode the current frame to be decoded according to the target reference frame, to obtain a reconstructed video frame corresponding to the current frame to be decoded.

S1220. Determine a current decoding mode corresponding to the current frame to be decoded according to current encoding mode information included in the encoded data.

S1222. Process the reconstructed video frame corresponding to the current frame to be decoded according to the current decoding mode, to obtain a decoded video frame.

According to the foregoing video decoding method, a sampling manner of a reference frame corresponding to a current frame to be decoded may be flexibly selected, so that the reference frame is sampled based on the sampling manner to obtain a target reference frame. Then, the current frame to be decoded is decoded according to the target reference frame, to obtain a reconstructed video frame. The sampling manner of the reference frame may be selected flexibly to perform sampling and reconstruction on the reference frame and adjust a resolution of the reference frame. Therefore, the reference frame, even if having a resolution different from that of the current current frame to be decoded, may still be used as a reference frame, thereby improving the use efficiency of the reference frame, improving the accuracy of inter-frame prediction, reducing a prediction residual, and improving the quality of a decoded image.

FIG. 12 is a schematic flowchart of a video decoding method according to an example embodiment. It is to be appreciated that, operations in the flowchart in FIG. 12 are displayed in sequence based on indication of arrows, but the operations are not necessarily performed sequentially based on the sequence indicated by the arrows. Unless otherwise explicitly specified in the disclosure, execution of the operations is not strictly limited, and the operations may be performed in other sequences. In addition, at least some operations in FIG. 12 may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

Figure 13:
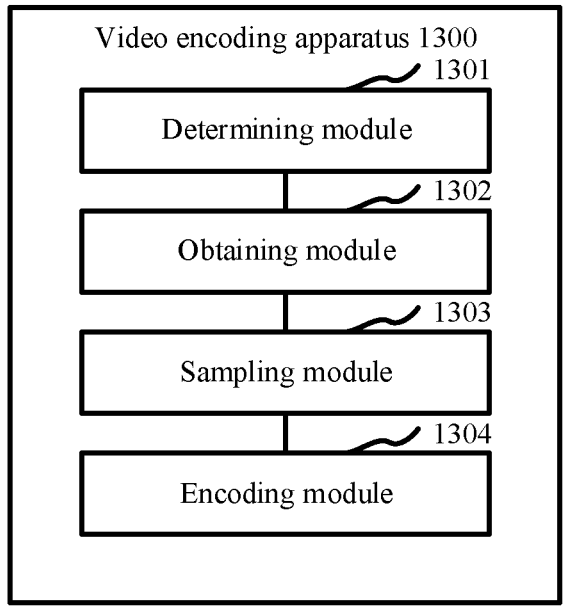
FIG. 13 is a structural block diagram of a video encoding apparatus according to an example embodiment.

As shown in FIG. 13, in an example embodiment, a video encoding apparatus 1300 is provided. The apparatus includes: a determining module 1301, an obtaining module 1302, a sampling module 1303, and an encoding module 1304.

The determining module 1301 is configured to determine a current frame to be encoded.

The obtaining module 1302 is configured to obtain a reference frame corresponding to the current frame to be encoded.

The determining module 1301 is further configured to determine a sampling manner configured corresponding to the current frame to be encoded.

The sampling module 1303 is configured to sample the reference frame based on the sampling manner according to resolution information of the current frame to be encoded, to obtain a corresponding target reference frame.

The encoding module 1304 is configured to encode the current frame to be encoded according to the target reference frame, to obtain encoded data corresponding to the current frame to be encoded.

In an example embodiment, the sampling module 1303 is further configured to: upsample, in a case that a resolution indicated by the resolution information of the current frame to be encoded is greater than a resolution indicated by resolution information of the reference frame, the reference frame based on the sampling manner according to the resolution information of the current frame to be encoded, to obtain the corresponding target reference frame.

In an example embodiment, the determining module 1301 is further configured to determine, according to local hardware information and/or image feature information of the current frame to be encoded, a sampling manner for upsampling the reference frame.

In an example embodiment, the sampling module 1303 is further configured to: downsample, in a case that the resolution indicated by the resolution information of the current frame to be encoded is less than the resolution indicated by the resolution information of the reference frame, the reference frame based on the sampling manner according to the resolution information of the current frame to be encoded, to obtain the corresponding target reference frame.

In an example embodiment, the sampling module 1303 is further configured to sample the reference frame based on the sampling manner according to the resolution information of the current frame to be encoded, to obtain an intermediate reference frame; and perform sub-pixel interpolation processing on the intermediate reference frame, to obtain the target reference frame.

In an example embodiment, the sampling module 1303 is further configured to: determine, according to the resolution information of the current frame to be encoded and the resolution information of the reference frame, a sampling ratio for sampling the reference frame; and sample the reference frame according to the sampling manner and the sampling ratio, to obtain the corresponding target reference frame.

Figure 14:
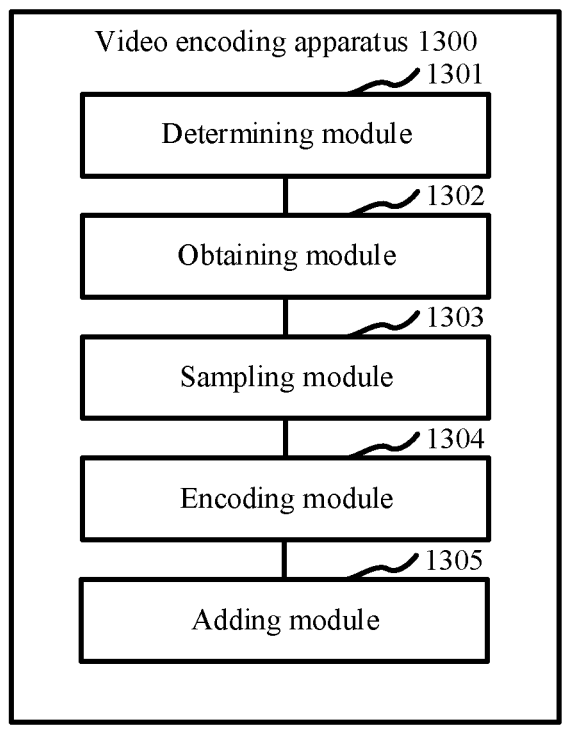
FIG. 14 is a structural block diagram of a video encoding apparatus according to another example embodiment.

As shown in FIG. 14, in an example embodiment, the video encoding apparatus 1300 further includes an adding module 1305. The adding module 1305 is configured to add, to encoded data corresponding to the reference frame, sampling manner information corresponding to the sampling of the reference frame.

In an example embodiment, the adding module 1305 is configured to add, to at least one of a sequence header information field, a video frame group header information field and a frame-level header information field, the sampling manner information corresponding to the sampling of the reference frame.

In an example embodiment, the determining module 1301 is further configured to: obtain an input video frame; determine a current encoding mode of the current frame to be encoded, the current encoding mode being selected from a full-resolution mode and a downsampling mode; and determine the current frame to be encoded based on the input video frame according to the current encoding mode.

In the foregoing video encoding apparatus, a sampling manner of a reference frame corresponding to a current frame to be encoded may be flexibly selected, and the reference frame is sampled according to the sampling manner to obtain a target reference frame. The current frame to be encoded is encoded according to the target reference frame, to reduce the data amount of to-be-encoded data. The sampling manner of the reference frame may be selected flexibly to perform sampling and reconstruction on the reference frame and adjust a resolution of the reference frame. Therefore, the reference frame, even if having a resolution different from that of the current current frame to be encoded, may still be used as a reference frame, thereby improving the use efficiency of the reference frame, improving the accuracy of inter-frame prediction, reducing a prediction residual, and improving the quality of an encoded image.

Figure 15:
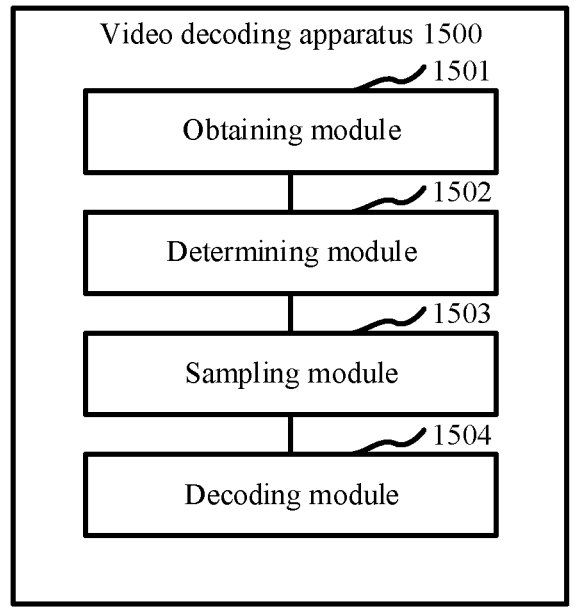
FIG. 15 is a structural block diagram of a video decoding apparatus according to an example embodiment.

As shown in FIG. 15, in an example embodiment, a video decoding apparatus 1500 is provided. The apparatus includes: an obtaining module 1501, a determining module 1502, a sampling module 1503, and a decoding module 1504.

The obtaining module 1501 is configured to obtain encoded data corresponding to a current frame to be decoded.

The determining module 1502 is configured to determine a reference frame corresponding to the current frame to be decoded.

The determining module 1502 is further configured to determine a sampling manner configured corresponding to the current frame to be decoded.

The sampling module 1503 is configured to sample the reference frame based on the sampling manner according to resolution information of the current frame to be decoded, to obtain a corresponding target reference frame.

The decoding module 1504 is configured to decode the current frame to be decoded according to the target reference frame, to obtain a reconstructed video frame corresponding to the current frame to be decoded.

In an example embodiment, the sampling module 1503 is further configured to: upsample, in a case that a resolution indicated by the resolution information of the current frame to be decoded is greater than a resolution indicated by resolution information of the reference frame, the reference frame based on the sampling manner according to the resolution information of the current frame to be decoded, to obtain the corresponding target reference frame.

In an example embodiment, the determining module 1502 is further configured to determine, according to local hardware information and/or image feature information of the current frame to be decoded, a sampling manner for upsampling the reference frame.

In an example embodiment, the sampling module 1503 is further configured to: downsample, in a case that the resolution indicated by the resolution information of the current frame to be decoded is less than the resolution indicated by the resolution information of the reference frame, the reference frame based on the sampling manner according to the resolution information of the current frame to be decoded, to obtain the corresponding target reference frame.

In an example embodiment, the sampling module 1503 is further configured to sample the reference frame based on the sampling manner according to the resolution information of the current frame to be decoded, to obtain an intermediate reference frame; and perform sub-pixel interpolation processing on the intermediate reference frame, to obtain the target reference frame.

In an example embodiment, the sampling module 1503 is further configured to: determine, according to the resolution information of the current frame to be decoded and the resolution information of the reference frame, a sampling ratio corresponding to the sampling of the reference frame; and sample the reference frame according to the sampling manner and the sampling ratio, to obtain the corresponding target reference frame.

Figure 16:
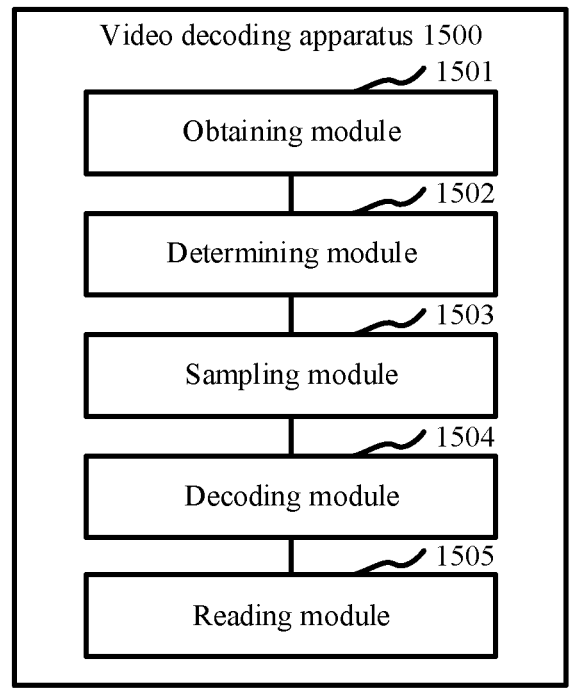
FIG. 16 is a structural block diagram of a video decoding apparatus according to another example embodiment.

As shown in FIG. 16, in an example embodiment, the video decoding apparatus 1500 further includes a reading module 1505, where the reading module 1505 is configured to read sampling manner information from encoded data corresponding to the reference frame; and determine, according to the sampling manner information, the sampling manner configured for the current frame to be decoded.

In an example embodiment, the reading module 1505 is configured to read the sampling manner information from at least one of a sequence header information field, a video frame group header information field, and a frame-level header information field.

In an example embodiment, the decoding module 1504 is further configured to determine a current decoding mode corresponding to the current frame to be decoded according to current encoding mode information included in the encoded data; and process the reconstructed video frame corresponding to the current frame to be decoded according to the current decoding mode to obtain a decoded video frame.

According to the foregoing video decoding apparatus, a sampling manner of a reference frame corresponding to a current frame to be decoded may be flexibly selected, and the reference frame is sampled according to the sampling manner to obtain a target reference frame. Then, the current frame to be decoded is decoded according to the target reference frame, to obtain a reconstructed video frame. The sampling manner of the reference frame may be selected flexibly to perform sampling and reconstruction on the reference frame and adjust a resolution of the reference frame. Therefore, the reference frame, even if having a resolution different from that of the current current frame to be decoded, may still be used as a reference frame, thereby improving the use efficiency of the reference frame, improving the accuracy of inter-frame prediction, reducing a prediction residual, and improving the quality of a decoded image.

Figure 17:
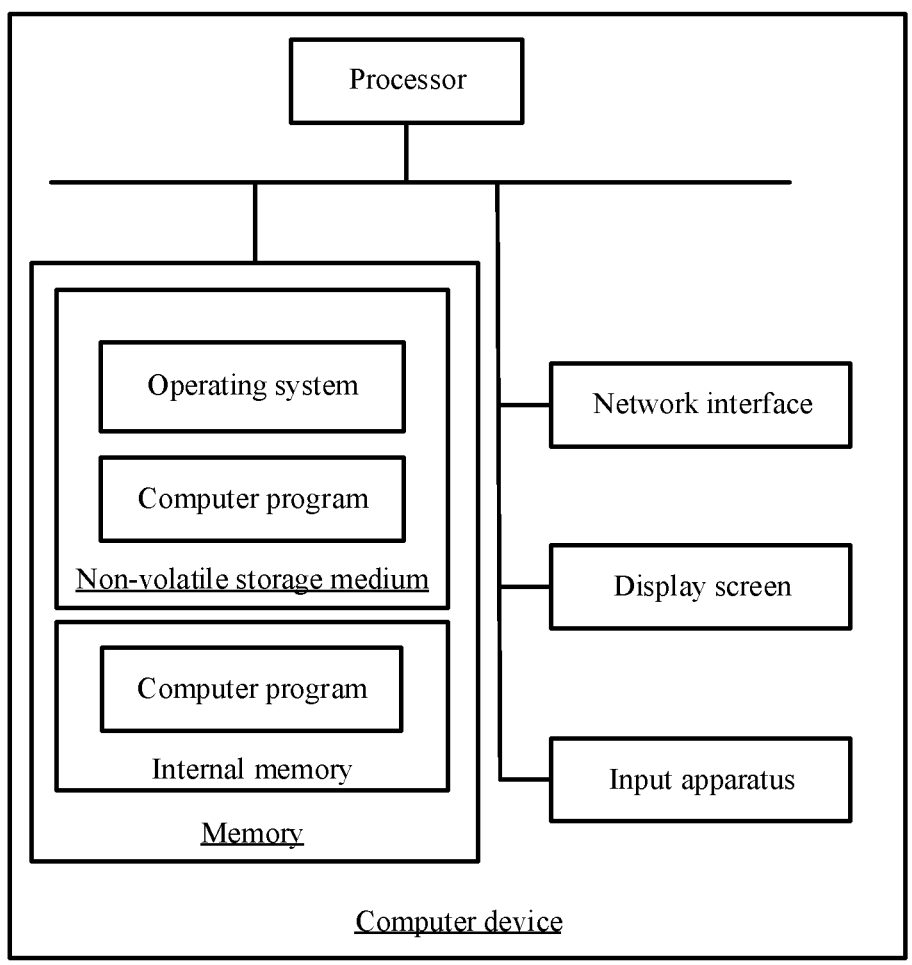
FIG. 17 is a structural block diagram of a computer device according to an example embodiment.

FIG. 17 is a diagram of an internal structure of a computer device according to an example embodiment. The computer device may be, for example, the terminal 110 in FIG. 1. As shown in FIG. 17, the computer device includes a processor, a memory, a network interface, an input apparatus and a display screen that are connected by using a system bus. The memory includes a non-transitory, non-volatile storage medium and an internal memory. The non-volatile storage medium of the computer device stores an operating system, and may further store a computer program. The computer program, when being executed by the processor, may cause the processor to implement at least one of the video encoding method and the video decoding method. The internal memory may also store a computer program. When being executed by the processor, the computer program may cause the processor to perform at least one of the video encoding method and the video decoding method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse, or the like.

Figure 18:
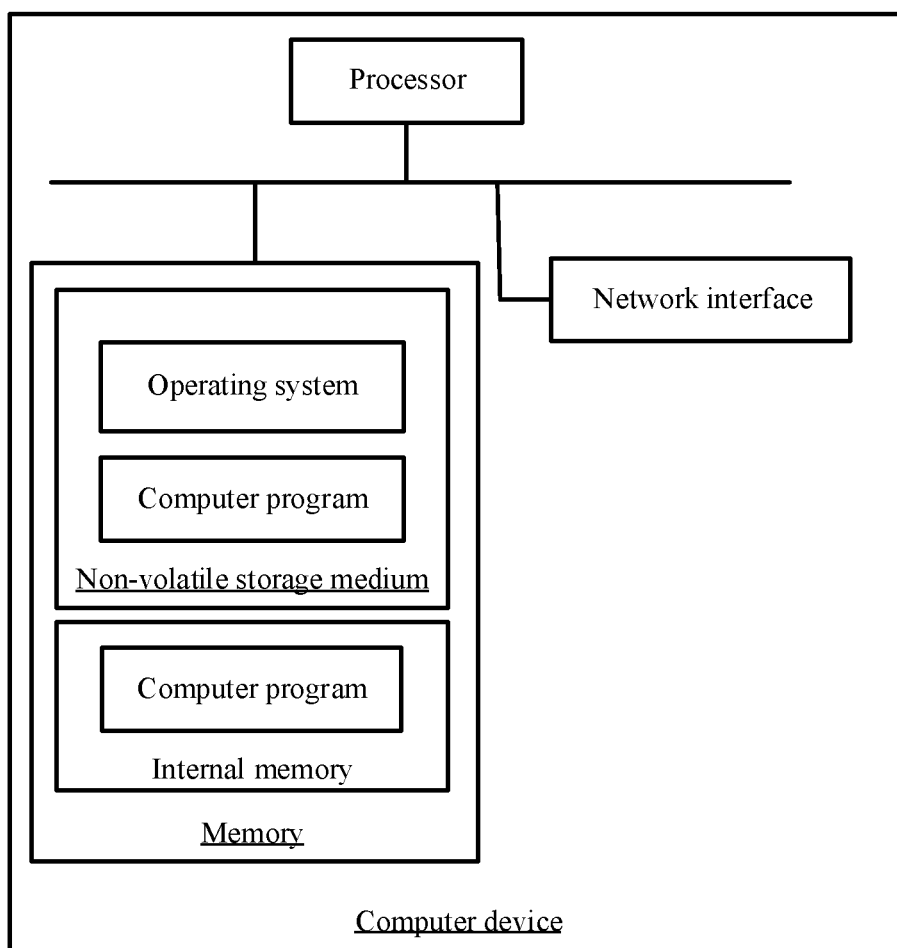
FIG. 18 is a structural block diagram of a computer device according to an example embodiment.

FIG. 18 is a diagram of an internal structure of a computer device according to an example embodiment. The computer device may be, for example, the server 120 in FIG. 1. As shown in FIG. 18, the computer device includes a processor, a memory, and a network interface that are connected by using a system bus. The memory includes a non-transitory, non-volatile storage medium and an internal memory. The non-volatile storage medium of the computer device stores an operating system, and may further store a computer program. The computer program, when being executed by the processor, may cause the processor to implement at least one of the video encoding method and the video decoding method. The internal memory may also store a computer program. When being executed by the processor, the computer program may cause the processor to perform at least one of the video encoding method and the video decoding method.

A person skilled in the art should understand that, the structures shown in FIG. 17 and FIG. 18 are merely block diagrams of partial structures related to solutions in the disclosure, and do not constitute a limitation to the computer device to which the solutions in the disclosure are applied. Specifically, the computer device may include more or fewer components than those shown in the figures, or have some components combined, or have a different component deployment.

In an example embodiment, the video encoding apparatus and/or video decoding apparatus provided in the disclosure may be implemented in a form of a computer program. The computer program may run on the computer device shown in FIG. 17 or FIG. 18. The memory of the computer device may store program modules forming the video encoding apparatus and/or the video decoding apparatus, for example, the determining module, the obtaining module, the sampling module, and the encoding module shown in FIG. 13. The computer program formed by the various program modules causes the processor to perform the operations of the video encoding method described in the embodiments of the disclosure in this specification. For another example, the obtaining module, the determining module, the sampling module, and the decoding module shown in FIG. 14 may be stored in the memory of the computer device. The computer program formed by the program modules causes the processor to perform the operations of the video decoding method in the embodiments of the disclosure described in this specification.

For example, the computer device shown in FIG. 17 or FIG. 18 may perform operations S502 and S506 by using the determining module in the video encoding apparatus shown in FIG. 13. The computer device may perform operation S504 by using the obtaining module. The computer device may perform operation S508 by using the sampling module. The computer device may perform operation S510 by using the encoding module.

For another example, the computer device shown in FIG. 17 or FIG. 18 may perform operation S1002 by using the obtaining module in the video encoding apparatus shown in FIG. 15. The computer device may perform operations S1004 and S1006 by using the determining module. The computer device may perform operation S1008 by using the sampling module. The computer device may perform operation S1010 by using the decoding module.

In an example embodiment, a computer device is provided, including: a memory and a processor, the memory storing a computer program, the computer program, when being executed by the processor, causing the processor to perform the video encoding method provided in the foregoing embodiment.

The foregoing computer device may flexibly select a sampling manner corresponding to a reference frame corresponding to a current frame to be encoded, and the reference frame is sampled according to the sampling manner to obtain a target reference frame. The current frame to be encoded is encoded according to the target reference frame, to reduce the data amount of to-be-encoded data. The sampling manner of the reference frame may be selected flexibly to perform sampling and reconstruction on the reference frame and adjust a resolution of the reference frame. Therefore, the reference frame, even if having a resolution different from that of the current current frame to be encoded, may still be used as a reference frame, thereby improving the use efficiency of the reference frame, improving the accuracy of inter-frame prediction, reducing a prediction residual, and improving the quality of an encoded image.

In an example embodiment, a computer device is provided, including: a memory and a processor, the memory storing a computer program, and the computer program, when being executed by the processor, causing the processor to perform the video decoding method provided in the foregoing embodiment.

The foregoing computer device may flexibly select a sampling manner corresponding to a reference frame corresponding to a current frame to be decoded, so that the reference frame is sampled based on the sampling manner to obtain a target reference frame. Then, the current frame to be decoded is decoded according to the target reference frame, to obtain a reconstructed video frame. The sampling manner of the reference frame may be selected flexibly to perform sampling and reconstruction on the reference frame and adjust a resolution of the reference frame. Therefore, the reference frame, even if having a resolution different from that of the current current frame to be decoded, may still be used as a reference frame, thereby improving the use efficiency of the reference frame, improving the accuracy of inter-frame prediction, reducing a prediction residual, and improving the quality of a decoded image.

An example embodiment of the disclosure provides a computer-readable storage medium, storing a computer program, the computer program being executed by a processor to implement the video encoding method provided in the foregoing embodiment.

The computer program stored in the foregoing computer-readable storage medium may be used to flexibly select a sampling manner corresponding to a reference frame corresponding to a current frame to be encoded, so that the reference frame is sampled according to the sampling manner to obtain a target reference frame. The current frame to be encoded is encoded according to the target reference frame, to reduce the data amount of to-be-encoded data. The sampling manner of the reference frame can be selected flexibly to perform sampling and reconstruction on the reference frame and adjust a resolution of the reference frame. Therefore, the reference frame, even if having a resolution different from that of the current current frame to be encoded, may still be used as a reference frame, thereby improving the use efficiency of the reference frame, improving the accuracy of inter-frame prediction, reducing a prediction residual, and improving the quality of an encoded image.

An example embodiment of the disclosure provides a computer-readable storage medium, storing a computer program, the computer program being executed by a processor to implement the video decoding method provided in the foregoing embodiment.

The foregoing computer-readable storage medium may flexibly select a sampling manner corresponding to a reference frame corresponding to a current frame to be decoded, so that the reference frame is sampled according to the sampling manner to obtain a target reference frame. Then, the current frame to be decoded is decoded according to the target reference frame, to obtain a reconstructed video frame. The sampling manner of the reference frame may be selected flexibly to perform sampling and reconstruction on the reference frame and adjust a resolution of the reference frame. Therefore, the reference frame, even if having a resolution different from that of the current current frame to be decoded, may still be used as a reference frame, thereby improving the use efficiency of the reference frame, improving the accuracy of inter-frame prediction, reducing a prediction residual, and improving the quality of a decoded image.

A person of ordinary skill in the art should understand that all or some of the processes of the methods in the foregoing embodiments may be implemented by a computer program instructing relevant hardware. The program may be stored in a non-volatile computer-readable storage medium. When the program is executed, the processes of the foregoing method embodiments may be performed. Any reference to a memory, a storage, a database, or another medium used in the embodiments provided in the disclosure can include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (DRAM).

The technical features in the foregoing embodiments may be randomly combined. For concise description, not all possible combinations of the technical features in the embodiment are described. However, all of the combinations of the technical features should be considered as falling within the scope described in this specification provided that they do not conflict with each other.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments only describe several implementations of the disclosure, which are described in detail, but are not to be construed as a limitation to the patent scope of the disclosure. A person of ordinary skill in the art may further make variations and improvements without departing from the ideas of the disclosure, and such variations and improvements all fall within the spirit and scope of the appended claims and included in the protection scope of the disclosure.

What is claimed is:

1. A method, performed by a computer device, the method comprising:
   obtaining a reference frame corresponding to a current frame from a video input to be encoded;
   determining a sampling manner corresponding to the current frame;
   sampling the reference frame based on the sampling manner, according to resolution information of the current frame, to obtain a target reference frame corresponding to the reference frame; and
   encoding the current frame according to the target reference frame,
   wherein the obtaining the reference frame corresponding to the current frame to be encoded includes:
   obtaining a first reference rule, which includes a relationship between resolution values of the current frame to be encoded and a reference frame; and
   obtaining the reference frame corresponding to the current frame to be encoded according to the first reference rule,
   wherein, when the first reference rule refers to a case where the resolution values of the current frame to be encoded and the reference frame are different from each other, the obtained first reference rule includes one of the followings: (i) an original-resolution current frame to be encoded is referenced to a downsampled-resolution reference frame; (ii) a downsampled-resolution current frame to be encoded is referenced to an original-resolution reference frame; (iii) an original-resolution current frame to be encoded is referenced to an original-resolution reference frame; and (iv) a downsampled-resolution current frame to be encoded is referenced to a downsampled-resolution reference frame, and
   wherein the original-resolution current frame or reference frame has a same resolution of a corresponding input video frame, and the downsampled-resolution current frame or reference frame is obtained by downsampling a corresponding input video frame or reference frame.

2. The method according to claim 1, wherein the determining the sampling manner comprises:
   determining, according to at least one of local hardware information and image feature information of the current frame, a sampling manner for upsampling the reference frame.

3. The method according to claim 1, wherein the sampling comprises:
   based on a resolution indicated by the resolution information of the current frame being greater than a resolution indicated by resolution information of the reference frame, upsampling the reference frame based on the sampling manner according to the resolution information of the current frame, to obtain the target reference frame.

4. The method according to claim 1, wherein the sampling comprises:
   based on a resolution indicated by the resolution information of the current frame being less than a resolution indicated by resolution information of the reference frame, downsampling the reference frame based on the sampling manner according to the resolution information of the current frame, to obtain the target reference frame.

5. The method according to claim 1, wherein the sampling comprises:
   sampling the reference frame based on the sampling manner according to the resolution information of the current frame, to obtain an intermediate reference frame; and
   performing sub-pixel interpolation processing on the intermediate reference frame, to obtain the target reference frame.

6. The method according to claim 1, wherein the sampling comprises:
   determining, according to the resolution information of the current frame and resolution information of the reference frame, a sampling ratio corresponding to the sampling of the reference frame; and
   sampling the reference frame according to the sampling manner and the sampling ratio, to obtain the target reference frame.

7. The method according to claim 1, further comprising:
   adding, to encoded data corresponding to the reference frame, sampling manner information corresponding to the sampling of the reference frame.

8. The method according to claim 7, wherein the adding comprises:
   adding, to at least one of a sequence header information field, a video frame group header information field, and a frame-level header information field of the encoded data, the sampling manner information corresponding to the sampling of the reference frame.

9. The method according to claim 1, further comprising:
   obtaining an input video frame;
   determining a current encoding mode of the current frame, the current encoding mode being selected from a full-resolution mode and a downsampling mode; and
   determining the current frame based on the input video frame and according to the current encoding mode.

10. A video decoding method, applied to a computer device, the method comprising:
    determining a reference frame corresponding to a current frame from a video input to be decoded;
    determining a sampling manner corresponding to the current frame;
    sampling the reference frame based on the sampling manner according to resolution information of the current frame, to obtain a target reference frame corresponding to the reference frame; and
    decoding the current frame according to the target reference frame,
    wherein the determining the reference frame corresponding to the current frame to be encoded includes:
    obtaining a first reference rule, which includes a relationship between resolution values of the current frame to be encoded and a reference frame; and
    determining the reference frame corresponding to the current frame to be encoded according to the first reference rule,
    wherein, when the first reference rule refers to a case where the resolution values of the current frame to be encoded and the reference frame are different from each other, the obtained first reference rule includes one of the followings: (i) an original-resolution current frame to be encoded is referenced to a downsampled-resolution reference frame; (ii) a downsampled-resolution current frame to be encoded is referenced to an original-resolution reference frame; (iii) an original-resolution current frame to be encoded is referenced to an original-resolution reference frame; and (iv) a downsampled-resolution current frame to be encoded is referenced to a downsampled-resolution reference frame, and wherein the original-resolution current frame or reference frame has a same resolution of a corresponding input video frame, and the downsampled-resolution current frame or reference frame is obtained by downsampling a corresponding input video frame or reference frame.

11. The method according to claim 10, wherein the determining the sampling manner comprises:

determining, according to at least one of local hardware information and image feature information of the current frame, a sampling manner for upsampling the reference frame.

12. The method according to claim 10, wherein the sampling comprises:

based on a resolution indicated by the resolution information of the current frame being greater than a resolution indicated by resolution information of the reference frame, upsampling the reference frame based on the sampling manner according to the resolution information of the current frame, to obtain the target reference frame.

13. The method according to claim 10, wherein the sampling comprises:

based on a resolution indicated by the resolution information of the current frame being less than a resolution indicated by resolution information of the reference frame, downsampling the reference frame based on the sampling manner according to the resolution information of the current frame, to obtain the target reference frame.

14. The method according to claim 10, wherein the sampling comprises:

sampling the reference frame based on the sampling manner according to the resolution information of the current frame, to obtain an intermediate reference frame; and performing sub-pixel interpolation processing on the intermediate reference frame, to obtain the target reference frame.

15. The method according to claim 10, wherein the sampling comprises:

determining, according to the resolution information of the current frame and resolution information of the reference frame, a sampling ratio corresponding to the sampling of the reference frame; and sampling the reference frame according to the sampling manner and the sampling ratio, to obtain the target reference frame.

16. The method according to claim 10, wherein the determining the sampling manner comprises:

reading sampling manner information from encoded data corresponding to the reference frame; and determining, according to the sampling manner information, the sampling manner corresponding to the current frame.

17. The method according to claim 16, wherein the reading comprises:

reading the sampling manner information from at least one of a sequence header information field, a video frame group header information field, and a frame-level header information field of the encoded data.

18. The method according to claim 10, further comprising:

obtaining encoded data corresponding to the current frame;

determining a current decoding mode corresponding to the current frame according to current encoding mode information included in the encoded data; and processing a reconstructed video frame corresponding to the current frame according to the current decoding mode, to obtain a decoded video frame.

19. A video encoding apparatus, comprising:

at least one memory configured to store program code; and at least one processor configured to read the program code and operate as instructed by the program code, the program code comprising:

obtaining code configured to cause at least one of the at least one processor to obtain a reference frame corresponding to a current frame from a video input to be encoded;

determining code configured to cause at least one of the at least one processor to determine a sampling manner corresponding to the current frame;

sampling code configured to cause at least one of the at least one processor to sample the reference frame based on the sampling manner according to resolution information of the current frame, to obtain a target reference frame corresponding to the reference frame; and encoding code configured to cause at least one of the at least one processor to encode the current frame according to the target reference frame, wherein the obtaining code is configured to cause at least one of the at least one processor to obtain a first reference rule, which includes a relationship between resolution values of the current frame to be encoded and a reference frame; and obtain the reference frame corresponding to the current frame to be encoded according to the first reference rule, wherein, when the first reference rule refers to a case where the resolution values of the current frame to be encoded and the reference frame are different from each other, the obtained first reference rule includes one of the followings: (i) an original-resolution current frame to be encoded is referenced to a downsampled-resolution reference frame; (ii) a downsampled-resolution current frame to be encoded is referenced to an original-resolution reference frame; (iii) an original-resolution current frame to be encoded is referenced to an original-resolution reference frame; and (iv) a downsampled-resolution current frame to be encoded is referenced to a downsampled-resolution reference frame, and wherein the original-resolution current frame or reference frame has a same resolution of a corresponding input video frame, and the downsampled-resolution current frame or reference frame is obtained by downsampling a corresponding input video frame or reference frame.

20. A non-transitory computer-readable storage medium, storing a computer program executable by at least one processor to cause the at least one processor to perform the method according to claim 1.

* * * * *